(12) United States Patent
Oxley et al.

(10) Patent No.: US 12,134,425 B2
(45) Date of Patent: Nov. 5, 2024

(54) VEHICLE ROCKER COMPONENT

(71) Applicant: Shape Corp., Grand Haven, MI (US)

(72) Inventors: Brian Oxley, Ada, MI (US); Matthew Kuipers, Holland, MI (US); Joseph R. Matecki, Allendale, MI (US); Cody Alger, Allendale, MI (US); Douglas S. Baas, Zeeland, MI (US)

(73) Assignee: Shape Corp., Grand Haven, MI (US)

( * ) Notice: Subject to any disclaimer, the term of this patent is extended or adjusted under 35 U.S.C. 154(b) by 263 days.

(21) Appl. No.: 17/656,696

(22) Filed: Mar. 28, 2022

(65) Prior Publication Data

US 2022/0212720 A1 Jul. 7, 2022

Related U.S. Application Data

(63) Continuation-in-part of application No. 17/222,326, filed on Apr. 5, 2021, now Pat. No. 11,560,180.
(Continued)

(51) Int. Cl.
*B62D 25/02* (2006.01)
*B62D 21/15* (2006.01)
(Continued)

(52) U.S. Cl.
CPC ......... *B62D 25/025* (2013.01); *B62D 21/157* (2013.01); *B62D 27/023* (2013.01); *B62D 29/00* (2013.01)

(58) Field of Classification Search
CPC ... B62D 25/025; B62D 21/157; B62D 27/023
(Continued)

(56) References Cited

U.S. PATENT DOCUMENTS 4,545,612 A 10/1985 Harasaki
4,669,776 A 6/1987 Harasaki
(Continued)

FOREIGN PATENT DOCUMENTS

CN 206336331 U 7/2017
DE 19525347 C1 7/1996
(Continued)

OTHER PUBLICATIONS

Text KR19980038592 (Year: 1998).*
(Continued)

*Primary Examiner* — Dennis H Pedder
(74) *Attorney, Agent, or Firm* — Bodman PLC

(57) ABSTRACT

A rocker component for a vehicle having a reinforcement beam including a metal sheet that is shaped with a plurality of elongated bends extending in parallel along a length of the reinforcement beam that together form a cross-sectional shape extending continuously along the length of the reinforcement beam. The cross-sectional shape of the reinforcement beam includes a beam portion and a flange portion integrally extending from the beam portion and includes an edge of the metal sheet. The rocker component also includes a sill panel having flanges extending longitudinally along upper and lower edges of the sill panel relative to the vehicle, the flange portion of the reinforcement beam joined to one of the flanges of the sill panel to secure the reinforcement beam to the sill panel in replacement of a separate second sill panel.

20 Claims, 20 Drawing Sheets

Related U.S. Application Data

(60) Provisional application No. 63/005,519, filed on Apr. 6, 2020.

(51) Int. Cl.
 *B62D 27/02* (2006.01)
 *B62D 29/00* (2006.01)

(58) Field of Classification Search
 USPC ............................... 296/209, 187.12, 29, 30
 See application file for complete search history.

(56) References Cited

U.S. PATENT DOCUMENTS

| | | | | |
|---|---|---|---|---|
| 4,826,238 | A * | 5/1989 | Misono | B62D 25/2036 296/205 |
| 5,207,475 | A | 5/1993 | Hellstroem | |
| 5,782,525 | A | 7/1998 | Honma et al. | |
| 9,783,239 | B2 | 10/2017 | Akira et al. | |
| 10,710,638 | B2 | 7/2020 | Kawase et al. | |
| 10,894,469 | B2 | 1/2021 | Page et al. | |
| 10,919,577 | B2 * | 2/2021 | Douglas | B62D 25/025 |
| 11,167,803 | B2 | 11/2021 | Kim | |
| 11,203,381 | B2 | 12/2021 | Schuppert et al. | |
| 11,235,646 | B2 | 2/2022 | Suzuki et al. | |
| 11,299,020 | B2 | 4/2022 | Honda et al. | |
| 2006/0001294 | A1 | 1/2006 | Balgaard et al. | |
| 2006/0043774 | A1 * | 3/2006 | McNulty | B62D 25/025 296/209 |
| 2007/0187995 | A1 | 8/2007 | Mouch et al. | |
| 2008/0106119 | A1 * | 5/2008 | Ma | B62D 21/157 296/187.12 |
| 2011/0175399 | A1 | 7/2011 | Takashi | |
| 2015/0246692 | A1 | 9/2015 | Shivaprasad et al. | |
| 2015/0360733 | A1 | 12/2015 | Nagwanshi et al. | |
| 2017/0247071 | A1 | 8/2017 | Schneider et al. | |
| 2017/0297631 | A1 | 10/2017 | Schneider et al. | |
| 2019/0077462 | A1 | 3/2019 | Yang et al. | |
| 2019/0176584 | A1 * | 6/2019 | Yaza | B60J 5/0412 |
| 2019/0389515 | A1 * | 12/2019 | Nakauchi | B60G 99/002 |
| 2020/0114973 | A1 | 4/2020 | Takahashi et al. | |
| 2020/0148272 | A1 | 5/2020 | Leblanc et al. | |
| 2020/0148277 | A1 | 5/2020 | Leblanc et al. | |
| 2020/0164820 | A1 | 5/2020 | Baas et al. | |
| 2021/0023920 | A1 | 1/2021 | Honda et al. | |
| 2021/0023922 | A1 | 1/2021 | Honda et al. | |
| 2021/0023923 | A1 | 1/2021 | Honda et al. | |
| 2021/0024138 | A1 | 1/2021 | Kaiki et al. | |
| 2022/0063728 | A1 | 3/2022 | Kuipers et al. | |

FOREIGN PATENT DOCUMENTS

| | | | |
|---|---|---|---|
| DE | 19538844 | A1 | 4/1997 |
| DE | 102004033971 | A1 | 2/2006 |
| DE | 102010016474 | A1 | 10/2011 |
| JP | 2006168594 | A | 6/2006 |
| JP | 2016512799 | A | 5/2016 |
| KR | 0166296 | B1 * | 9/1998 |
| KR | 19980038592 | U * | 9/1998 |
| KR | 19980038599 | U * | 9/1998 |
| WO | 2012095991 | A1 | 7/2012 |

OTHER PUBLICATIONS

Text KR19980038599 (Year: 1998).*
Text KR 10090038605 (Year: 1998).*
International Search Report for application No. PCT/US2021/025748 mailed Jul. 1, 2021, 12 pp.
European Search Report for Application No. 21785040.3; mailed Mar. 28, 2024; 8 pp.

* cited by examiner

VEHICLE ROCKER COMPONENT

CROSS-REFERENCE TO RELATED APPLICATIONS

This application is a continuation-in-part application of U.S. non-provisional application Ser. No. 17/222,326, filed Apr. 5, 2021, which claims benefit and priority under 35 U.S.C. § 119(e) of U.S. provisional application Ser. No. 63/005,519, filed Apr. 6, 2020, the disclosure of which are hereby incorporated herein by reference in its entireties.

TECHNICAL FIELD

The present disclosure generally relates to structural members and beams, and more particularly relates to vehicle components, such as for use as structural and reinforcement beams on vehicle frames or associated vehicle assemblies.

BACKGROUND

Vehicles, such as automobiles, typically have a rigid structural frame or body structure, which is commonly referred to as a body-in-white or a body-in-black. The vehicle frame or body structure is designed to undergo and absorb certain levels of impact forces, such as to meet insurance requirements and other regulatory and legal requirements. With respect to impact reinforcement and structural beams used in a vehicle body or frame, it is generally known that these beams can be reinforced, such as with more robust reinforcement beam structure or with reinforcement interior inserts to increase stiffness, such as tubular reinforcement inserts or bulkhead reinforcement inserts.

SUMMARY

The disclosure provides a vehicle structural component, such as a rocker component, that includes a multi-hollow reinforcement beam. The reinforcement beam may include a beam portion having a multi-hollow cross-sectional shape and at least one flange portion that integrally extends from the beam portion. The reinforcement beam may be formed with a metal sheet, such as by roll forming the sheet to have a multi-hollow cross-sectional at the beam portion and to have the flange portion integrally extending from the beam portion, such as at an edge of the metal sheet. The reinforcement beam may extend along the vehicle component or may be disposed at a desired section of the vehicle component to reinforce the respective section of the vehicle component and optionally replace adjacent components of the vehicle component. The vehicle component may be a rocker component, such that the flange portion or portions of the reinforcement beam may be attached to a vehicle structure, such as to the frame, door sill, sills, floor, pillars, crossmembers or like components.

According to one aspect of the disclosure, a rocker component for a vehicle includes a reinforcement beam that has a metal sheet formed with a cross-sectional shape extending continuously along a length of the reinforcement beam. The reinforcement beam has a beam portion and a flange portion integrally extending from the beam portion. The flange portion integrally extends from the beam portion and includes an edge of the metal sheet. The beam portion has a multi-hollow shape that encloses a plurality of hollow cavities that extend longitudinally between openings at opposing ends of the reinforcement beam. The rocker component also has a bracket with a first section joined to the beam portion of the reinforcement beam and a second section integrally extending from the first section away from the beam portion. The rocker component further includes a sill panel that has upper and lower flanges extending longitudinally along upper and lower edges of the sill panel relative to the vehicle. The flange portion of the reinforcement beam is joined to one of the upper and lower flanges of the sill panel. The second section of the bracket is joined to the other one of the upper and lower flanges to secure the reinforcement beam to the sill panel in replacement of a separate second sill panel.

According to another aspect of the disclosure, a rocker component for a vehicle includes a reinforcement beam that has a metal sheet shaped with a plurality of elongated bends extending in parallel along a length of the reinforcement beam that together form a cross-sectional shape that extends continuously along the length of the reinforcement beam. The cross-sectional shape of the reinforcement beam includes a beam portion and a flange portion that integrally extends from the beam portion. The flange portion integrally extends from the beam portion and extends continuously along the length of the reinforcement beam. The beam portion has a closed cross-sectional shape that encloses at least one hollow cavity that extend longitudinally between openings at opposing ends of the reinforcement beam. The rocker component also includes a sill panel that has flanges extending longitudinally along upper and lower edges of the sill panel relative to the vehicle. The flange portion of the reinforcement beam is joined to one of the flanges of the sill panel to secure the reinforcement beam to the sill panel in replacement of a separate sill panel outer.

Each of the above independent aspects of the present disclosure, and those aspects described in the detailed description below, may include any of the features, options, and possibilities set out in the present disclosure and figures, including those under the other independent aspects, and may also include any combination of any of the features, options, and possibilities set out in the present disclosure and figures.

The details of one or more implementations of the disclosure are set forth in the accompanying drawings and the description below. Other aspects, advantages, purposes, and features will be apparent upon review of the following specification in conjunction with the drawings.

BRIEF DESCRIPTION OF THE DRAWINGS

Like reference numerals indicate like parts throughout the drawings.

DETAILED DESCRIPTION

Figure 1:
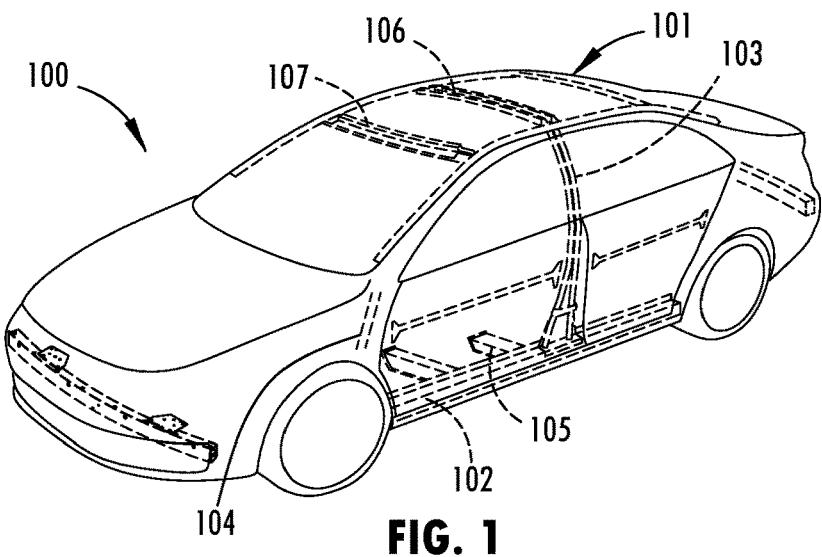
FIG. 1 is a perspective view of a vehicle schematically illustrating various vehicle components in dashed lines.
Figure 1A:
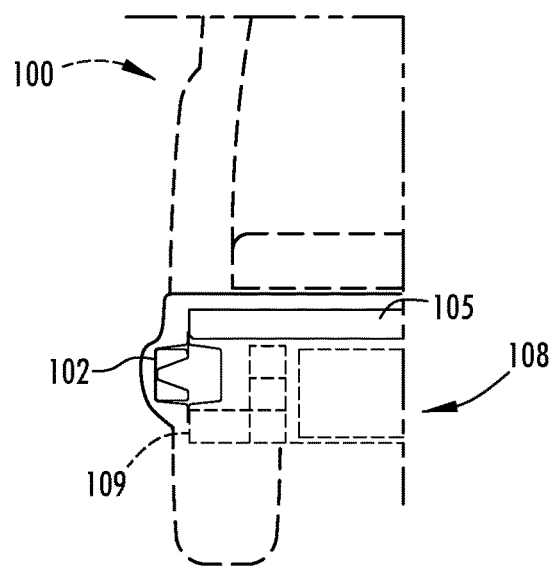
FIGS. 1A and 1B are cross-sectional views of side portions of exemplary vehicles.
Figure 1B:
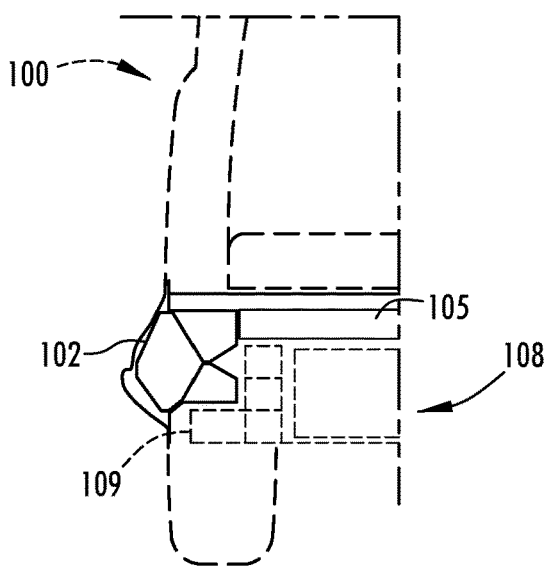
Figure 2:
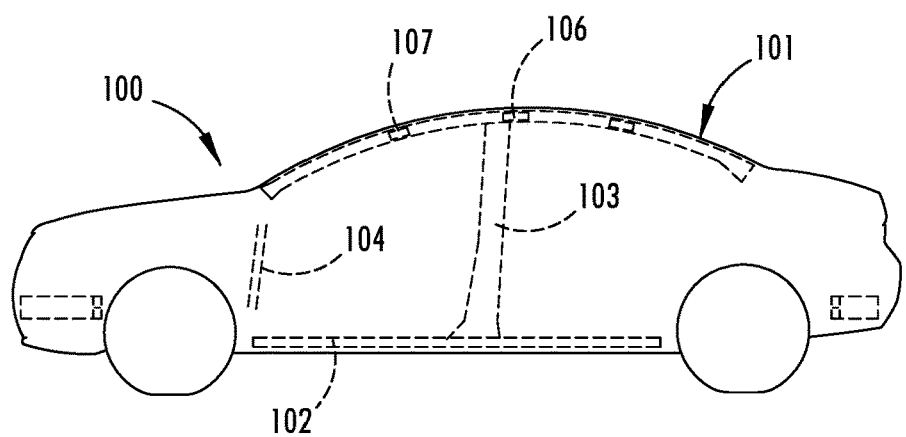
FIG. 2 is a side elevation view of the vehicle shown in FIG. 1.

Referring now to the drawings and the illustrative embodiments depicted therein, a vehicle component is provided for a vehicle 100, such as for a body structure or frame 101 as shown in FIGS. 1 and 2. The vehicle frame 101 and associated components may have various designs and configurations, such as for different styles and types of vehicles. As shown for example FIGS. 1 and 2, the vehicle component may be implemented as a rocker component 102, among other vehicle components, such as a B-pillar 103, a hinge pillar 104, a floor crossmember 105, a roof bow 106, or a header 107, among other conceivable vehicle structural components. Also, the vehicle may be partially operated by a propulsion system that uses a battery, such as a traction battery or battery modules, which may be supported in a battery tray generally located between the axles and near the floor of the vehicle to distribute the battery weight and establish a low center of gravity for the vehicle. For example, as shown in FIGS. 1A and 1B, the multi-hollow vehicle component may be a rocker component 102 (e.g., as further shown in FIG. 16) that is disposed alongside a battery tray 108 with the floor crossmember 105 being attached to the rocker component 102 so as to span laterally over the battery tray 108. Accordingly, the vehicle component in additional implementations may also or alternatively be provided as a battery tray frame component, such as a longitudinally oriented side wall section 109 of the battery tray. Further, the vehicle component may be embodied as the entire piece or as part of the respective vehicle component.

The vehicle component may be used, for example, as a structural component or a battery tray component and as such may be designed to undergo various impact forces and to support and sustain different loading conditions. When designing the vehicle component with the reinforcement beam disclosed herein, the outer dimensions of the vehicle component may be reduced and the overall weight of the vehicle component may be reduced while meeting the required impact and loading conditions. The reinforcement beam may span a partial section of the vehicle component or the entire length of the component, such as to extend beyond the component into and to also reinforce an adjacent component. The reinforcement beam disclosed herein may comprise the entire vehicle component or may be joined to additional reinforcements or parts of the vehicle component, such as at desired sections of the vehicle component. For example, the integral flange portion of the reinforcement beam may attach to a sill panel without adding significant processing steps, such as by not needing to include access holes in the sill panel of a rocker component, as is commonly done to access an interior welding location of an insert of a rocker section. Also, a flange attachment of the reinforcement beam to the vehicle component may allow for easily accessible spot welding to attach the reinforcement beam to a sill panel of the vehicle component, which may eliminate or reduce reliance on more expensive welding techniques, such as laser welding or MIG welding within a hollow component. Moreover, the reinforcement beam disclosed herein may be formed with a sheet material, such as by roll forming a metal sheet, to provide the beam with a relatively high strength (for shear and axial loading) and low weight in comparison to common rocker panels, such as to allow the still panels of the corresponding vehicle component (if provided) to use less material, occupy a smaller packaging space, and have greater flexibility in the outer shape design.

The cross-sectional shape of different examples of the vehicle component and reinforcement beam may include various shapes and thicknesses for the desired application of the vehicle component. The vehicle component may also include a sill panel or panels, such as sill inner and sill outer panels that attach together around an interior area, where the terms "inner" and "outer" are made in reference to inboard or inward facing and outboard or outward facing directions on the vehicle, such oriented in FIG. 1. Unless specified to the contrary, it is generally understood that additional implementations of the rocker component may have an opposite orientation from the examples shown and described, such as where the sill panels identified as an inner panel may be used as the outer panel and the sill panels identified as an outer panel may be used as the inner panel. The cross-sectional shape of the inner and outer panels may vary along the vehicle component, such as, for example, by flaring outward at the ends (as may be used for B-pillar implementations). The reinforcement beam may have a multi-tubular shape that has two or more hollow interior areas that extend within the interior area of the vehicle component. The cross-sectional shape or profile of the reinforcement beam may generally have a consistent shape along the length of the reinforcement beam, such as to provide a consistent structural support, stiffness, and strength along the reinforcement beam.

Figure 3:
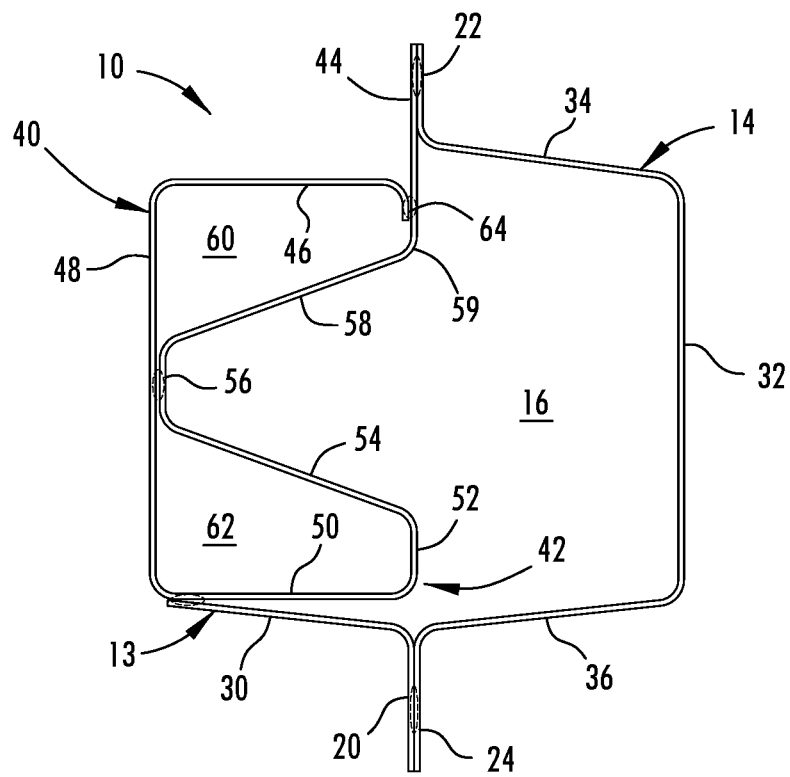
FIG. 3 is a cross-sectional view of rocker components having a reinforcement beam.

Referring now to the vehicle component 10 shown in FIG. 3, a sill panel 14 partially defines a hollow interior space 16. The vehicle component 10 shown in FIG. 3 is embodied as a vehicle rocker component, such as the rocker component 102 shown in FIGS. 1 and 2. The sill panel 14, which may be referred to as a sill outer panel of a rocker component, has a C-shaped cross section with flanges 18, 20 that together provide a generally hat-shaped cross section. The flanges 18, 20 may be referred to as an upper flange 18 and a lower flange 20 of the sill panel 14. The upper and lower flanges 18, 20 of the sill panel 14 shown in FIG. 3 extend longitudinally, continuously along the edges of the rocker component; however, it is contemplated that the flanges may be trimmed away in select areas to facilitate frame attachment or to reduce weight.

The sill panel 14, or outer panel of the rocker component 10 has an outer wall 32 that is substantially planar and integrally interconnects with an upper wall 34 and a lower wall 36 at its respective upper and lower ends. The corner transitions of approximately 100 degrees between the outer wall 32 and the upper and lower walls 34, 36 are defined by longitudinal bends to a sheet material that forms the second sill panel 14. The sheet material may be the same or different from the sill panel 14 and may include a metal sheet, such as an advanced high strength steel sheet or aluminum sheet. Similarly, the upper wall 34 also has a corner transition to the upper flange 22 and the lower wall 36 has a corner transition to the lower flange 24, which are each also defined by longitudinal bends in the sheet material of the second sill panel 14. Again, the corner transitions between the upper and lower walls 34, 36 and the upper and lower flanges 22, 24 and the inner wall 32 may have an angular transition greater or less than shown in FIG. 3, such as approximately between 80 and 160 degrees, between 90 and 120 degrees, between 95 and 110 degrees, or between 97 and 105 degrees.

A reinforcement beam 40, as shown for example in FIG. 3, is provided that includes a beam portion 42 with a multi-hollow cross-sectional shape. The beam portion 42 is disposed within the hollow interior space 16 of the rocker component 10. By disposing the beam portion 42 at the inner volume, bulkhead members are not included or otherwise necessary to stiffen the inner portion of the rocker component. The reinforcement beam 40 also includes a flange portion 44 that integrally extends from the beam portion 42. The flange portion 44 is configured to be joined to the first sill panel 14.

As shown in FIG. 3, the reinforcement beam 40 is roll formed from a metal sheet to provide the beam portion 42 and the flange portion 44 as integral sections of the metal sheet. The flange portion 44 of the reinforcement beam 40 is provided at and comprises an edge 45 of the metal sheet. The flange portion 44 extends longitudinally and continuously along a length of the reinforcement beam 40. The length of the reinforcement beam 40 is be substantially equal to a length of the hollow interior space 16. In additional implementations, the length of the reinforcement beam may be shorter than the length of the hollow interior space of the corresponding component, such as between 40% and 100%, between 30% and 90%, or between 30% and 60% of the length of the reinforcement beam. For example, in combustion powered vehicles a reinforcement beam may have length less than 90%, or in other examples less than 60%, of the length of the rocker component to be disposed at a desired longitudinal section of a rocker component, such as a central section that may be more susceptible to impact or unsupported areas between pillars or crossmembers of the vehicle.

As further shown in FIG. 3, the beam portion 42 of the reinforcement beam 40 has a plurality of longitudinal bends in the metal sheet that each form angular transitions between and define separate wall sections of the beam portion 42. Several wall sections are angled relative to each other to form a tubular shape that surrounds an interior area that extends longitudinally along the reinforcement beam. As shown in FIG. 3, the wall sections of the beam portion 42 include an upper wall section 46, an inner wall section 48, a lower wall section 50, an outer wall section 52, a lower shear wall section 54, a mid-wall section 56, and an upper shear wall section 58. The upper wall section 46, inner wall section 48, and upper shear wall section 58, together with a wall section 59 formed by a lower end of the flange portion 44 form a tubular shape that generally surrounds an upper interior area 60. Also, the inner wall section 48, lower wall section 50, outer wall section 52, and lower shear wall section 54 form a tubular shape that generally surrounds a lower interior area 62. The tubular shapes surrounding the upper and lower interior areas 60, 62 extend longitudinally along the reinforcement beam in parallel alignment with each other and are shown as mirror images of each other across the mid-wall section 48. However, additional examples of the reinforcement beam may have the tubular shapes unequal in size and having dissimilar shapes.

The beam portion 42 shown in FIG. 3 has an opposing edge 64 of the metal sheet from the flange portion 44 attached at an intermediate portion of the sheet to enclose at least one of the tubular shape. Specifically, the opposing edge 64 is bent to curve downward from the upper wall section 46 into the upper interior area 60 to attach to the wall section 59 in a lapped manner, such as to allow for biasing the opposing edge 64 against the wall section 59 when welding the exposed crevice, such as via laser welding in line with the roll forming operation used to form the reinforcement beam 40. The mid-wall section 56 may also be welded to the inner wall section 48, such as via laser welding or spot welding during the roll forming operation. In other implementations, the edge may be welded in a different configurations, such as a T-joint, and the welds may be supplemented or replaced with adhesive, fasteners, or combinations thereof.

The reinforcement beam 40 may be roll-formed from an advanced high-strength steel with a tensile strength above 1,000 MPA, such as approximately 1,500 MPa. The metal sheet used to roll form the reinforcement beam may be approximately 1-2 mm in thickness, such as between 1.2-1.6 mm. Also, the steel sheet used for the reinforcement beam and panels of the vehicle component is galvanized, so as to have a zinc coating that protects against corrosion. In some examples, however, the steel sheet of the reinforcement beam may not be galvanized, and in other examples the steel sheets that form the vehicle component may not be galvanized. In further examples, the metal sheet that forms the reinforcement beam is an aluminum sheet.

Referring still to FIG. 3, the rocker component 10 omits an inner sill panel and instead the inner wall section 48 of the reinforcement beam 40 defines the innermost wall of the rocker component 10. The reinforcement beam 40 shown in FIG. 3 is joined to the outer sill panel 14 with the integral flange portion 44 of the reinforcement beam 40 welded to the upper flange 22 of the outer sill panel 14, such as with a spot welding process or the like. To further retain the reinforcement beam to the outer sill panel 14, the lower flange 24 of the outer sill panel 14 may joined directly or indirectly to a lower portion of the reinforcement beam 40. As shown in FIG. 3, an inner bracket 13 may be provided to connect between the lower flange 24 and the reinforcement beam 14. The inner bracket 13 may extend continuously along the length of the rocker component 10 or may be divided into separate brackets that are attached at spaced locations along the length of the reinforcement beam 40 and the outer sill panel 14. When continuously provided, the inner bracket 13 may enclose the hollow interior space 16 of the rocker component 10 between the outer sill panel 14 and the reinforcement beam 40. The inner bracket 13 includes a lower flange 20 that is joined to the lower flange 24 of the outer sill panel 14 and an upper section that is integrally extends from the lower flange 24 and defines a lower wall 30. The lower wall 30 is joined to an outboard portion of the lower wall section 50 of the reinforcement beam 40 with a weld; however, it is contemplated that additional implementations of the inner bracket 13 may be joined at alternative locations on the reinforcement beam 40 (such as by extending upward without a bend transition to attach to the outer wall section 52 or the reinforcement beam 40) and may be joint with alternative joining features, such as fasteners, adhesive, and the like. Additionally, it is contemplated that the inner bracket 13 may comprise an upper inner bracket and a lower inner bracket, as described in more detail below.

Figure 4:
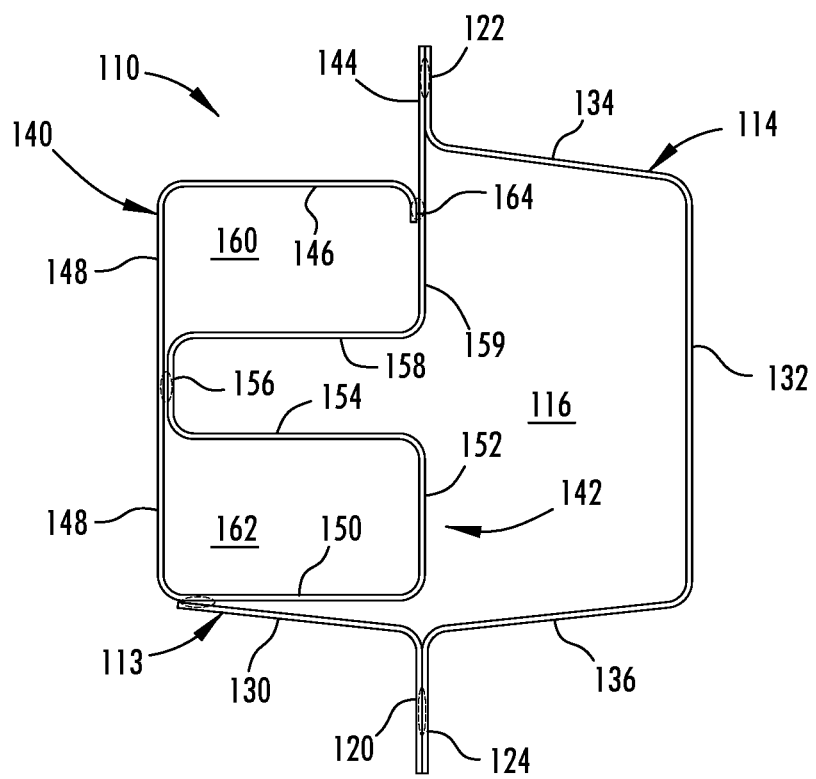
FIG. 4 is cross-sectional view of rocker components having a different example of a reinforcement beam.

With reference to the vehicle component 110 shown in FIG. 4, a sill panel 114 and a reinforcement beam 140 is provided that includes a beam portion 142 with a multi-hollow cross-sectional shape and a flange portion 144 that integrally extends from the beam portion 142. The beam portion 142 is disposed within the hollow interior space 116 of the rocker component 110, and specifically within the inner volume formed by the panel 114. The flange portion 144 is attached, such as via spot welding, to secure the reinforcement beam 140 relative to the panel 114. The beam portion 142 of the reinforcement beam 40 has a plurality of longitudinal bends in a metal sheet used to form the reinforcement beam 140 that each form angular transitions between and define separate wall sections of the beam portion 142.

As further shown in FIG. 4, the upper wall section 146, inner wall section 148, and upper shear wall section 158, together with a wall section 159 formed by a lower end of the flange portion 144 form a tubular shape that generally surrounds an upper interior area 160. Also, the inner wall section 148, lower wall section 150, outer wall section 152, and lower shear wall section 154 form a tubular shape that generally surrounds a lower interior area 162. The tubular shapes surrounding the upper and lower interior areas 160, 162 extend longitudinally along the reinforcement beam in parallel alignment with each other and each have a generally rectangular cross-sectional shape. Thus, when secured within the hollow interior space 116 of the rocker component, the upper and lower wall sections 146, 150, as well as the shear wall sections 154, 158 provide shear support to the inner wall 126 by being substantially perpendicular to the inner wall 126. To also reinforce the inner wall 126, the inner wall section 148 of the reinforcement beam 140 interfaces in contact with and may be attached at (e.g., via welding) a generally parallel inner surface of the inner wall 126. Other features of the reinforcement beam 140 that are similar to the reinforcement beam 40 are not described in detail again, and similar reference numbers are used, incremented by 100.

As shown in FIG. 4, the rocker component 110 omits an inner sill panel and instead the inner wall section 148 of the reinforcement beam 140 defines the innermost wall of the rocker component 110. The reinforcement beam 40 shown in FIG. 4 is joined to the outer sill panel 114 with the integral flange portion 144 of the reinforcement beam 40 welded to the upper flange 122 of the outer sill panel 114, such as with a spot welding process or the like. To further retain the reinforcement beam to the outer sill panel 114, the lower flange 124 of the outer sill panel 114 may joined directly or indirectly to a lower portion of the reinforcement beam 140. As shown in FIG. 4, an inner bracket 113 may be provided to connect between the lower flange 124 and the reinforcement beam 114. The inner bracket 113 may extend continuously along the length of the rocker component 110 or may be divided into separate brackets that are attached at spaced locations along the length of the reinforcement beam 40 and the outer sill panel 114. When continuously provided, the inner bracket 113 may enclose the hollow interior space 116 of the rocker component 110 between the outer sill panel 114 and the reinforcement beam 140. The inner bracket 113 includes a lower flange 120 that is joined to the lower flange 124 of the outer sill panel 114 and an upper section that is integrally extends from the lower flange 124 and defines a lower wall 130. The lower wall 130 is joined to an outboard portion of the lower wall section 150 of the reinforcement beam 140 with a weld; however, it is contemplated that additional implementations of the inner bracket 113 may be joined at alternative locations on the reinforcement beam 140 (such as by extending upward without a bend transition to attach to the outer wall section 152 or the reinforcement beam 140) and may be joint with alternative joining features, such as fasteners, adhesive, and the like.

Figure 5:
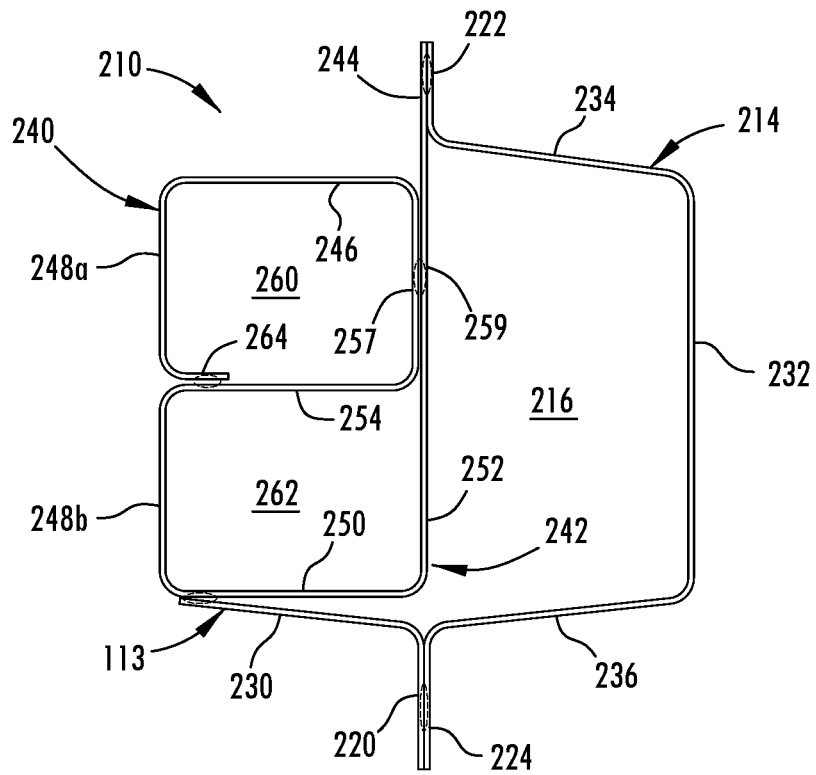
FIG. 5 is a cross-sectional view of rocker components having another example of a reinforcement beam.

Referring now to the vehicle component 210 shown in FIG. 5, a reinforcement beam 240 is provided that includes a beam portion 242 with a multi-hollow cross-sectional shape and a flange portion 244 that integrally extends from the beam portion 242. The multi-hollow cross-sectional shape of the beam portion 242 has two hollow interior areas 260, 262 that are divided by a single, common center wall section, shown as a center shear wall section 254. The reinforcement beam 240 may be roll formed from a metal sheet, so as to form a plurality of longitudinal bends in the metal sheet used that each form angular transition between separate wall sections of the beam portion 242.

As further shown in FIG. 5, the upper wall section 246, an upper inner wall section 248a, the center shear wall section 254, and an upper outer wall section 257 form a tubular shape that generally surrounds an upper interior area 260. Also, a lower inner wall section 248b, lower wall section 250, a lower outer wall section 252, and the center shear wall section 254 form a tubular shape that generally surrounds a lower interior area 262. The lower outer wall section 252 is provided in planar alignment with the flange portion 244 and is disposed at a lower end thereof. Also, the wall section 259 immediate above the lower outer wall section 252 is a planar extension of the flange portion 244 and overlaps the upper outer wall section 257 to provide a double wall thickness.

The beam portion 242 shown in FIG. 5 has an opposing edge 264 of the metal sheet from the flange portion 244 attached at an intermediate portion of the sheet to enclose the tubular shape around the upper interior area 260. Specifically, the opposing edge 264 is curved inward from the upper inner wall section 248a into the upper interior area 260 to attach to the center wall section 254 in a lapped manner to weld the exposed crevice, such as via laser welding. The wall section 259 may also be welded to the upper inner wall section 257, such as via laser welding. In other implementations, the edge may be welded in a different configurations, such as lap to the lower outer wall section or a T-joint with the corner transition between the center wall section and the lower outer wall section.

The tubular shapes surrounding the upper and lower interior areas 260, 262 extend longitudinally along the reinforcement beam in parallel alignment with each other and each have a generally rectangular cross-sectional shape. Thus, when secured within the hollow interior space 216 of the rocker component, the upper and lower wall sections 246, 250, as well as the center shear wall section 254 provide shear support to the inner wall 226 by being substantially perpendicular to the inner wall 226. To also reinforce the inner wall 226, the upper and lower inner wall sections 248a, 248b of the reinforcement beam 240 interfaces in contact with and may attach at a generally parallel inner surface of the inner wall 226. Other features of the reinforcement beam 240 that are similar to the reinforcement beam 40 are not described in detail again, and similar reference numbers are used, incremented by 200.

As further shown in FIG. 5, the rocker component 210 omits an inner sill panel and instead the inner wall section 248 of the reinforcement beam 240 defines the innermost wall of the rocker component 210. The reinforcement beam 240 shown in FIG. 5 is joined to the outer sill panel 214 with the integral flange portion 244 of the reinforcement beam 240 welded to the upper flange 222 of the outer sill panel 214, such as with a spot welding process or the like. To further retain the reinforcement beam to the outer sill panel 214, the lower flange 224 of the outer sill panel 214 may joined directly or indirectly to a lower portion of the reinforcement beam 240. As shown in FIG. 5, an inner bracket 213 may be provided to connect between the lower flange 224 and the reinforcement beam 214. The inner bracket 213 may extend continuously along the length of the rocker component 210 or may be divided into separate brackets that are attached at spaced locations along the length of the reinforcement beam 240 and the outer sill panel 214. When continuously provided, the inner bracket 213 may enclose the hollow interior space 216 of the rocker component 210 between the outer sill panel 214 and the reinforcement beam 240. The inner bracket 213 includes a lower flange 220 that is joined to the lower flange 224 of the outer sill panel 214 and an upper section that is integrally extends from the lower flange 224 and defines a lower wall 230. The lower wall 230 is joined to an outboard portion of the lower wall section 250 of the reinforcement beam 240 with a weld; however, it is contemplated that additional implementations of the inner bracket 213 may be joined at alternative locations on the reinforcement beam 240 (such as by extending upward without a bend transition to attach to the outer wall section 252 or the reinforcement beam 240) and may be joint with alternative joining features, such as fasteners, adhesive, and the like.

Figure 6:
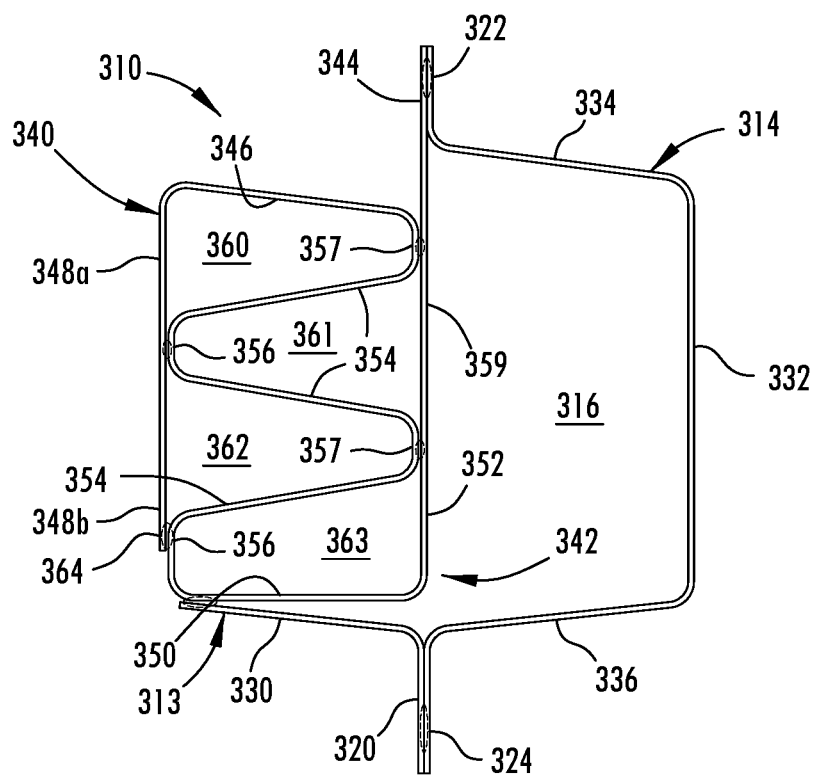
FIG. 6 is a cross-sectional view of rocker components having a further example of a reinforcement beam.

Referring now to FIG. 6, a rocker component 310 is shown that has a reinforcement beam 340 that is roll formed from a metal sheet to provide a beam portion 342 that includes a multi-hollow cross-sectional shape with four enclosed interior areas 360, 361, 362, 363 and five wall sections 346, 354, 350 that provide shear support and divide the enclosed interior areas. The flange portion 344 integrally extends from the beam portion 342 and is provided by an edge of the metal sheet used to form the beam portion 342. As shown in FIG. 6, the flange portion 344 extends linearly downward along an outer side of the beam portion 342 to a lower wall section 350, defining an upper outer wall section 359 and a lower outer wall section 352. From the inner end of the lower wall section 350, the metal sheet transitions upward in a serpentine curved formation to provide three intermediate shear wall sections 354 before transitioning outward at the upper wall section 346 before transitioning linearly downward along an inner side of the beam portion 342. The inner side of the beam portion 342 defines upper and lower inner wall section 348a, 348b.

As illustrated in FIG. 6, the beam portion 342 includes an upper wall section 346, an upper inner wall section 348a, a central shear wall section 354, and an upper outer wall section 357 that together form a tubular shape that generally surrounds an upper interior area 360. Adjacent to and below the upper interior area 360, an intermediate interior area 361 is bordered by the same central shear wall section 354, a mid-wall section 356, another central shear wall section 354, and an upper outer wall section 359. Adjacent to and below the intermediate interior area 361, another intermediate interior area 362 is bordered by the same central shear wall section 354 that borders the intermediate interior area 361, a lower inner wall section 348b, another central shear wall section 354, and a lower outer wall section 357. Finally, adjacent to and below the intermediate interior area 362, a lower interior area 363 is bordered by the same central shear wall section 354 that borders the intermediate interior area 362, a lower mid-wall section 356, a lower wall section 350, and a lower outer wall section 352.

As also shown in FIG. 6, the wall sections of the beam portion 342 provide shear support by wall sections that are substantially perpendicular to the inner wall 326, which is parallel to a planar extension of the flange portion 344 of the reinforcement beam 340. The shear support shown in FIG. 6 is provided by the lower wall section 350, as well as the shear wall sections 354 and the upper wall section 345 that are each angled approximately 30 degrees relative to the flange portion 344. In additional implementations, the serpentine shape may provide differently shaped wall sections, such as shear wall sections that are angled 0 to 60 degrees, or 0 to 45 degrees, or 0 to 30 degrees from a perpendicular extension from the inner wall 326 of the vehicle component 310. Other features of vehicle component 310 and associated reinforcement beam 340 that are similar to the vehicle component 10 and reinforcement beam 40 are not described in detail again, and similar reference numbers are used, incremented by 300.

Additionally as shown in FIG. 6, the inner sill panel is omitted and instead the inner wall section 348 of the reinforcement beam 340 defines the innermost wall of the rocker component 310. For sake of avoiding repetition, other features of the rocker component 310 shown in FIG. 6 that are the same or similar to the rocker component 310 of FIG. 6, including those with like reference numbers, are not described again in detail. The reinforcement beam 340 shown in FIG. 6 is joined to the outer sill panel 314 with the integral flange portion 344 of the reinforcement beam 340 welded to the upper flange 322 of the outer sill panel 314, such as with a spot welding process or the like. To further retain the reinforcement beam to the outer sill panel 314, the lower flange 324 of the outer sill panel 314 may joined directly or indirectly to a lower portion of the reinforcement beam 340. As shown in FIG. 6, an inner bracket 313 may be provided to connect between the lower flange 324 and the reinforcement beam 314. The inner bracket 313 may extend continuously along the length of the rocker component 310 or may be divided into separate brackets that are attached at spaced locations along the length of the reinforcement beam 340 and the outer sill panel 314. When continuously provided, the inner bracket 313 may enclose the hollow interior space 316 of the rocker component 310 between the outer sill panel 314 and the reinforcement beam 340. The inner bracket 313 includes a lower flange 320 that is joined to the lower flange 324 of the outer sill panel 314 and an upper section that is integrally extends from the lower flange 324 and defines a lower wall 330. The lower wall 330 is joined to an outboard portion of the lower wall section 350 of the reinforcement beam 340 with a weld; however, it is contemplated that additional implementations of the inner bracket 313 may be joined at alternative locations on the reinforcement beam 340 (such as by extending upward without a bend transition to attach to the outer wall section 352 or the reinforcement beam 340) and may be joint with alternative joining features, such as fasteners, adhesive, and the like.

Referring now to FIGS. 7A-16, the reinforcement beam may include a second flange portion, such as a flange portion 466, 566 (FIGS. 7A and 8A) formed by an opposing edge portion of the metal sheet. The second flange portion may be attached, such as with spot welding, to the sill panel. In doing so, the reinforcement beam may eliminate the use of one or both sill panels that can extend between the flanges so as to integrate some or all of the structural features of the individual sill panels. Also in providing the second flange portion as an integral extension from the beam portion of the reinforcement beam, in some examples, the beam portion of the reinforcement beam may be spaced or separated from the inner surfaces of the inner and outer panels of the vehicle component, such as to provide two points of connection between the reinforcement beam and the panel and additional hollow areas or lateral crush zones.

Figure 7A:
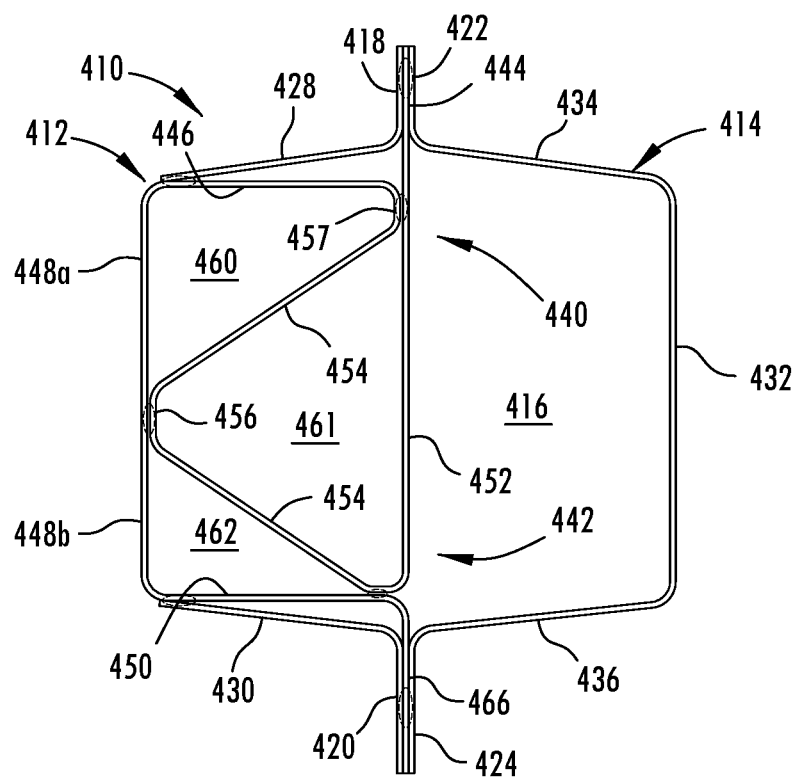
FIGS. 7A and 7B are cross-sectional views of rocker components having a different example of a reinforcement beam.

As shown in FIG. 7A, a reinforcement beam 440 is provided that includes a beam portion 442 with a multi-hollow cross-sectional shape and two flange portions 444, 466 that integrally extends from the beam portion 442. The multi-hollow cross-sectional shape of the beam portion 442 has three hollow interior areas 460, 461, 462 that are divided by central wall sections 454, 464. The reinforcement beam 440 is roll formed from a metal sheet, so as to form a plurality of longitudinal bends in the metal sheet used that each form angular transition between separate wall sections of the beam portion 442.

The cross-sectional shape of the beam portion 442, as shown in FIG. 7A, provides the upper flange portion 444 extending linearly downward along an outer side of the beam portion 442 to a lower wall section 450, defining an outer wall section 452 of the reinforcement beam 440. From the inner end of the lower wall section 450, the metal sheet transitions upward in a diagonal formation to provide two intermediate shear wall sections 454 before transitioning inward at the upper wall section 446 and then transitioning linearly downward along an inner side of the beam portion 442 to defines upper and lower outer wall section 448a, 448b. The upper wall section 446, the upper inner wall section 448a, a central shear wall section 454, and an upper outer wall section 457 together form a tubular shape that generally surrounds an upper interior area 460. Adjacent to and below the upper interior area 460, an intermediate interior area 461 is bordered by the same central shear wall section 454, a mid-wall section 456, another central shear wall section 454, and the outer wall section 452. Adjacent to and below the intermediate interior area 461, a lower interior area 462 is bordered by the same central shear wall section 454 that borders the intermediate interior area 461, a lower inner wall section 448b, and a lower wall section 450. The wall sections of the beam portion 442 provide shear support with wall sections that are substantially perpendicular to the inner wall 426, such as the lower wall section 450, upper wall section 446, as well as the shear wall sections 454 that are angled approximately 45 degrees relative to the flange portion 444. Other features of the vehicle component 410 and associated reinforcement beam 440 that are similar to the vehicle component 10 and reinforcement beam 40 are not described in detail again, and similar reference numbers are used, incremented by 400. A bracket with first section 430 and second section 420 is joined to the metal sheet.

As shown in FIG. 7A, the rocker component 410 has the inner sill panel omitted and instead the inner wall section 448 of the reinforcement beam 440 defines the innermost wall of the rocker component 410. Thus, the reinforcement beam 440 integrates a sill panel with a reinforcement structure utilizing a single metal sheet. The reinforcement beam 440 shown in FIG. 7A is joined to the outer sill panel 414 with the integral upper and lower flange portions 444, 466 welded to the respective upper and lower flanges 422, 424 of the outer sill panel 414, such as with spot welding or laser welding or the like.

Figure 7B:
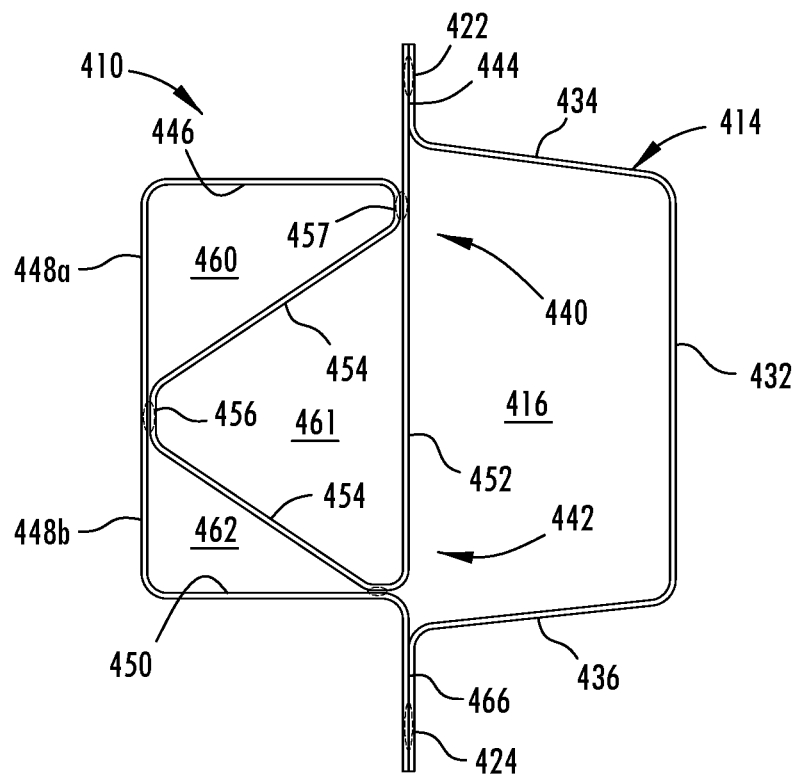

As shown in FIG. 7B, additional implementations of the rocker component 410 have the outer sill panel omitted. In this example, the wall section of the reinforcement beam adjacent to the omitted sill panel defines the corresponding innermost or outermost wall of the rocker component 410. Thus, the reinforcement beam 440 may integrate a sill panel with a reinforcement structure by utilizing a single metal sheet. Other features of the vehicle component 410 and associated reinforcement beam 440 that are similar to the vehicle components 10, 410 and reinforcement beams 40, 440 are not described in detail again, and like reference numbers are used, incremented by 400.

Figure 8A:
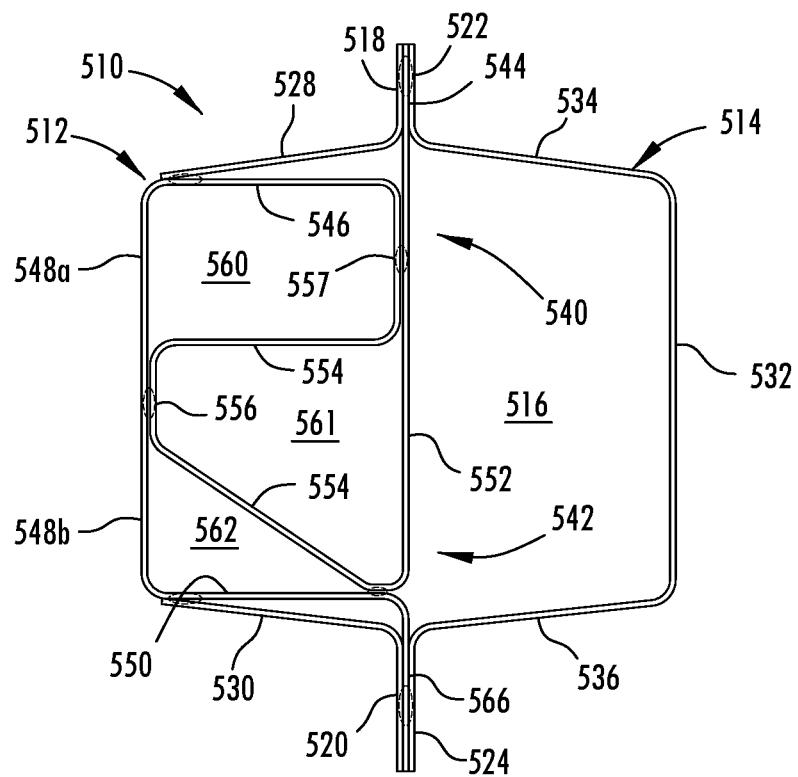
FIGS. 8A and 8B are cross-sectional views of rocker components having another example of a reinforcement beam.

As shown in FIG. 8A, a reinforcement beam 540 is provided with a similar configuration to the reinforcement beam 440 shown in FIG. 7A with a beam portion 542 that has three hollow interior areas 560, 561, 562 that are divided by central wall sections 554, 564. Different from the reinforcement beam 440, the central wall section 554 is oriented perpendicular relative to the inner wall 526 and the upper and lower inner wall section 548a, 548b. Accordingly, the upper outer wall section 557 and the mid-wall section 556 extend along a greater extent of the respective outer wall section 552 and inner wall section 548a, 548b.

Also, as shown in FIG. 8A, the rocker component 510 has the inner sill panel omitted and instead the inner wall section 548 of the reinforcement beam 540 defines the innermost wall of the rocker component 510. Thus, the reinforcement beam 440 integrates a sill panel with a reinforcement structure utilizing a single metal sheet. The reinforcement beam 540 shown in FIG. 8A is joined to the outer sill panel 514 with the integral upper and lower flange portions 544, 566 welded to the respective upper and lower flanges 522, 524 of the outer sill panel 514, such as with spot welding or laser welding or the like. Other features of the vehicle component 510 and associated reinforcement beam 540 that are similar to the vehicle components 10, 410 and reinforcement beams 40, 440 are not described in detail again, and similar reference numbers are used, incremented by 500.

Figure 8B:
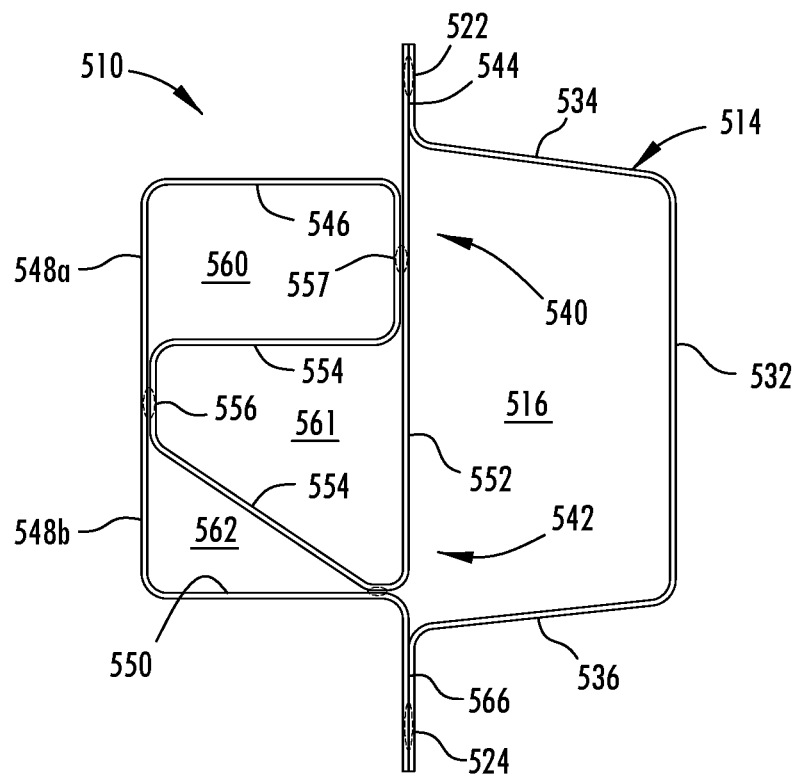

As shown in FIG. 8B, additional implementations of the rocker component 510 have the outer sill panel omitted. In this example, the wall section of the reinforcement beam adjacent to the omitted sill panel defines the corresponding innermost or outermost wall of the rocker component 510. Thus, the reinforcement beam 540 may integrate a sill panel with a reinforcement structure by utilizing a single metal sheet. Other features of the vehicle component 510 and associated reinforcement beam 540 that are similar to the vehicle components 10, 510 and reinforcement beams 40, 540 are not described in detail again, and like reference numbers are used, incremented by 500.

Referring to FIGS. 9A-16, the reinforcement beam may have a cross-sectional shape that is expanded laterally outward. In doing so, the outer portion of the rocker component may be stiffened, such as for decreasing impact intrusion resistance as may be desirable for electric vehicles having battery modules disposed between the rocker assemblies. As shown in FIGS. 9A-12D, the beam portion of the reinforcement beam includes two hollow interior areas that are divided by a common center wall section 654, 754, 854, 954 that is oriented substantially vertically in alignment with the upper and lower flanges and flange portions of the corresponding reinforcement beam. The vertical center wall sections 654, 754, 854, 954 are provided by a cross-sectional shape similar to the reinforcement beam 240 shown in FIG. 5 and rotated approximately 90 degrees about a longitudinal axis of the reinforcement beam to vertically orient the shear wall section 254.

With respect to the reinforcement beam 640 shown in FIG. 9A, the outer lower wall section 651 is disposed below and extending outward to overlap a portion of the inner lower wall section 650. The center wall section 654 extends upward beyond the inner upper wall section 646 to partially overlap a lower end of the flange portion 644, such that the outer upper wall section 645 that integrally extends from the upper end of the center wall section 654 is disposed vertically above the inner upper wall section 646. Other features of the vehicle component 610 and associated reinforcement beam 640 that are similar to the vehicle components 10, 410 and reinforcement beams 40, 440 are not described in detail again, and similar reference numbers are used, incremented by 600.

As shown in FIGS. 9A, 9B, 9C, and 9D, some implementations of the rocker component 610 have both the inner sill panel omitted and the outer sill panel omitted. In these examples, the wall section of the reinforcement beam adjacent to the omitted sill panel defines the corresponding innermost or outermost wall of the rocker component 610. Thus, the reinforcement beam 640 may integrate one or two sill panels with a reinforcement structure by utilizing a single metal sheet. Additionally, in the example shown in FIG. 9A, the rocker component includes brackets 628, 630, 634, and 636 to help support the reinforcement beam 640. The brackets 628, 630, 634, and 636 are generally L-shaped brackets which have a generally vertically extending portion similar to the flange portion of a sill inner and a laterally extending portion which extends to the corresponding shear wall of the reinforcement beam 645, 646, 650, 651. More specifically, FIG. 9A includes four brackets 628, 630, 634, 636, two upper and two lower which are configured to sandwich both upper and lower flange portions 644, 666 of the reinforcement beam. In the example shown in FIG. 9B, the brackets 628, 630 disposed adjacent to the inner portion of the reinforcement beam 640 are omitted while the brackets 634, 636 disposed adjacent to the outer portion of the reinforcement beam 640 are present. In the example shown in FIG. 9C, the brackets 634, 636 disposed adjacent to the outer portion of the reinforcement beam 640 are omitted while the brackets 628, 630 disposed adjacent the inner portion of the reinforcement beam 640 are present. In the example shown in FIG. 9D, all of the brackets 628, 630, 634, 636 are omitted. For sake of avoiding repetition, other features of the rocker component 610 shown in FIGS. 9A-9D that are the same or similar to the rocker component 610 of FIG. 9A, including those with like reference numbers, are not described again in detail.

Figure 9A:
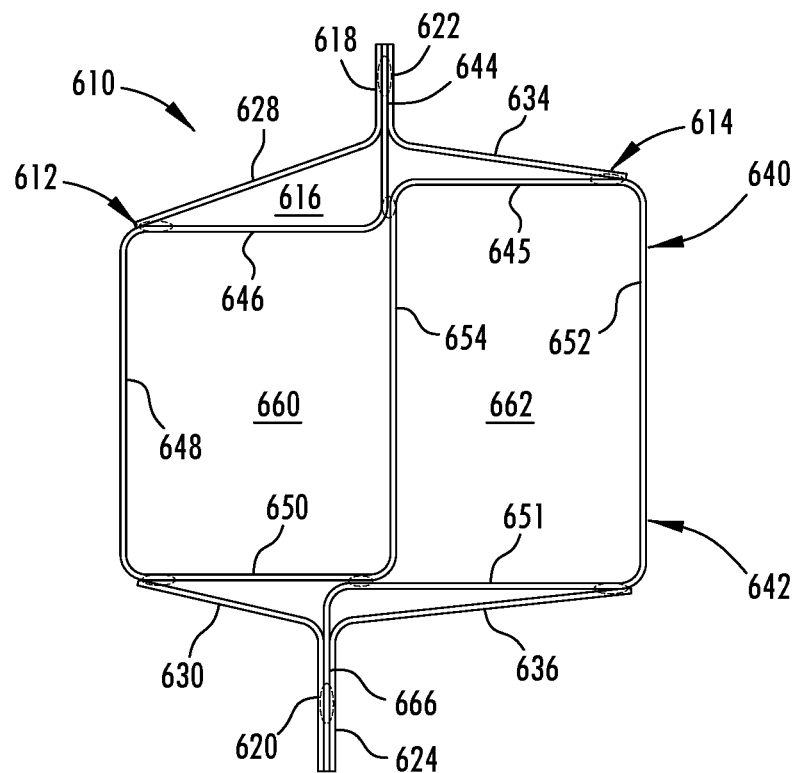
FIGS. 9A-9D are cross-sectional views of rocker components having a further example of a reinforcement beam.
Figure 9B:
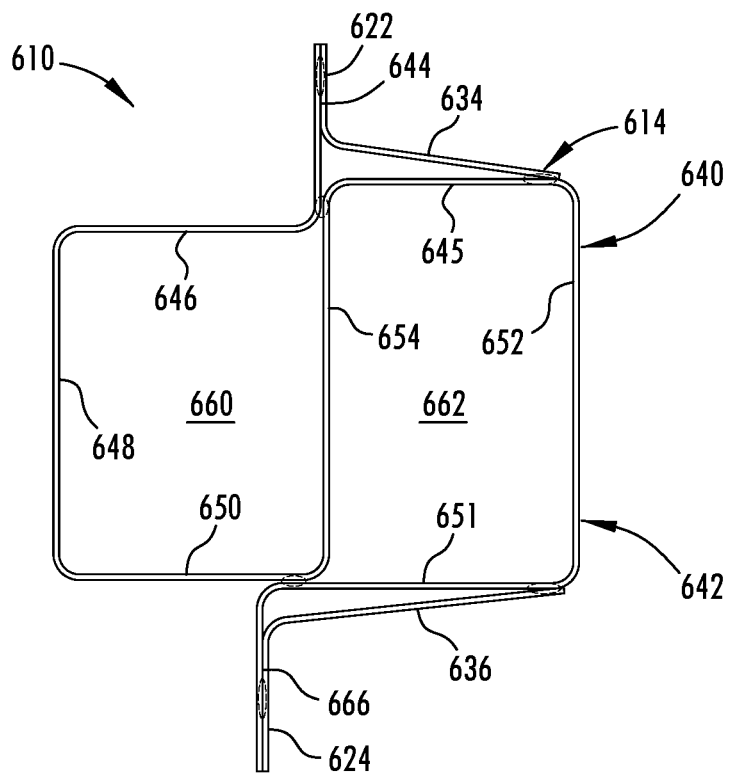
Figure 9C:
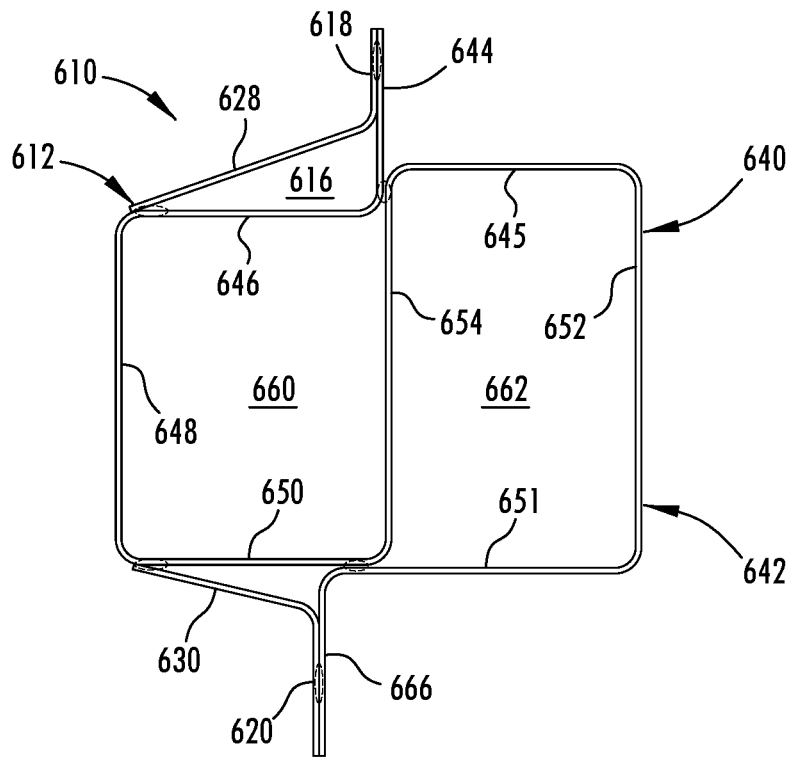
Figure 9D:
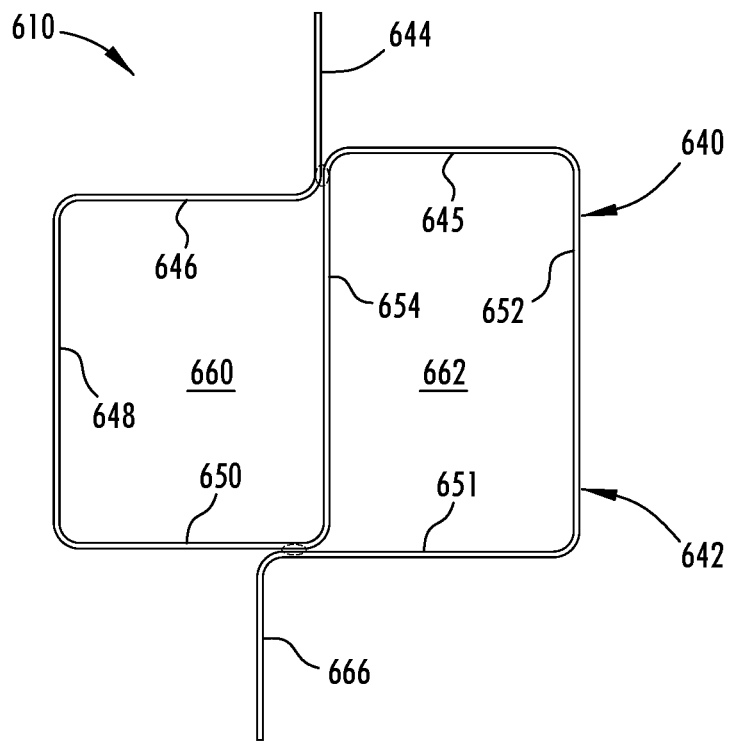
Figure 10A:
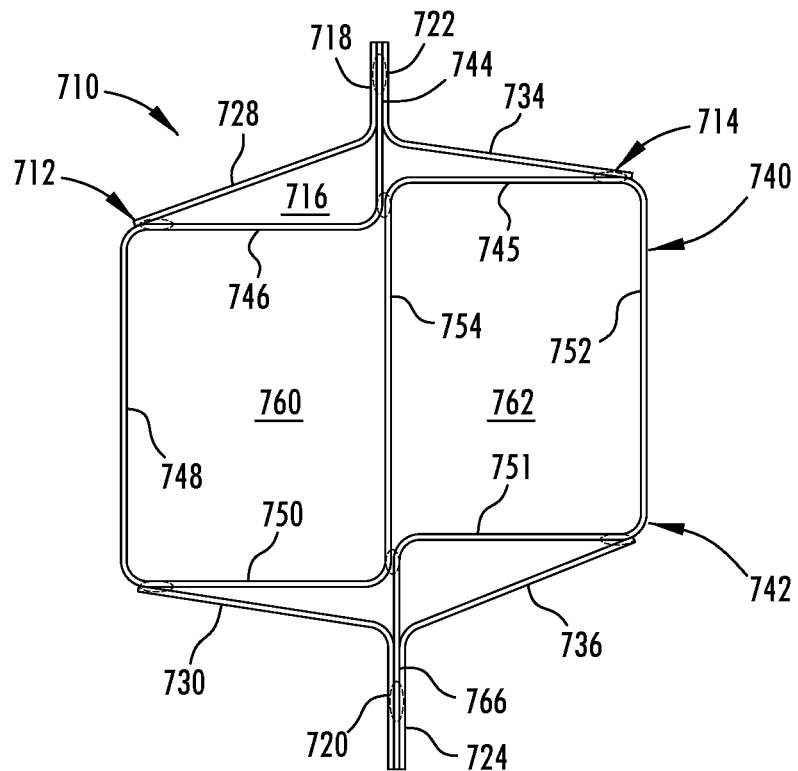
FIGS. 10A-10D are cross-sectional views of rocker components having a different example of a reinforcement beam.
Figure 10B:
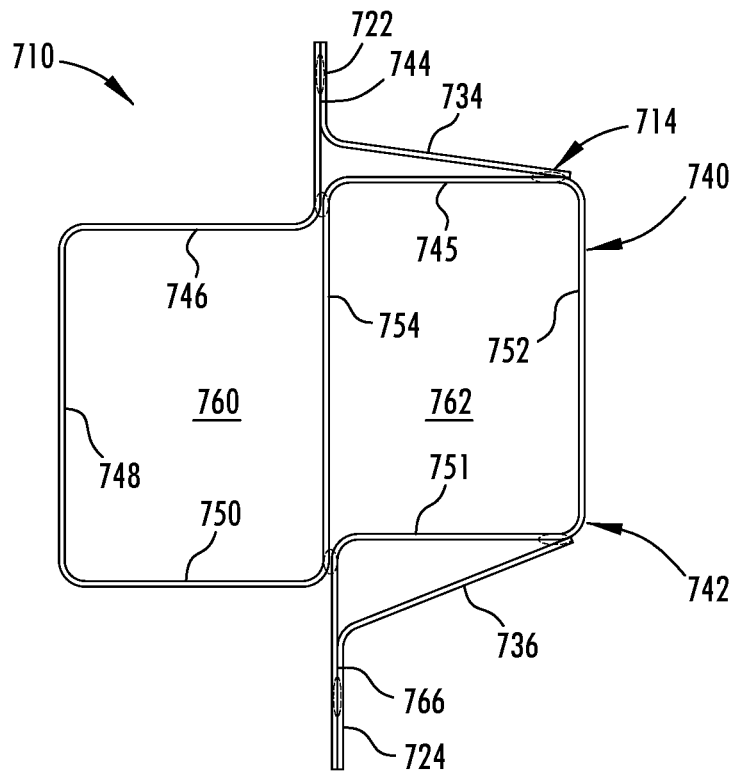
Figure 10C:
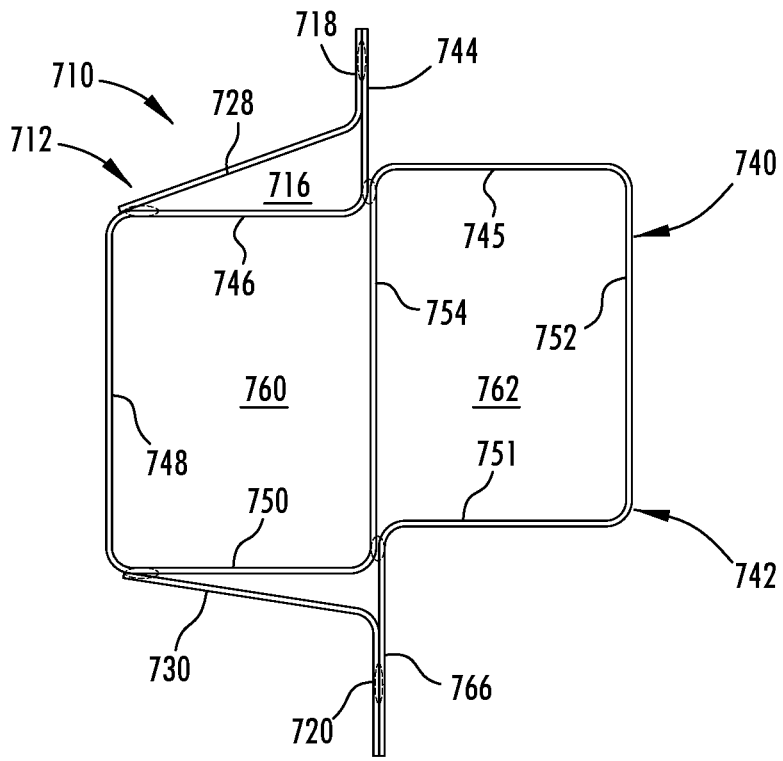
Figure 10D:
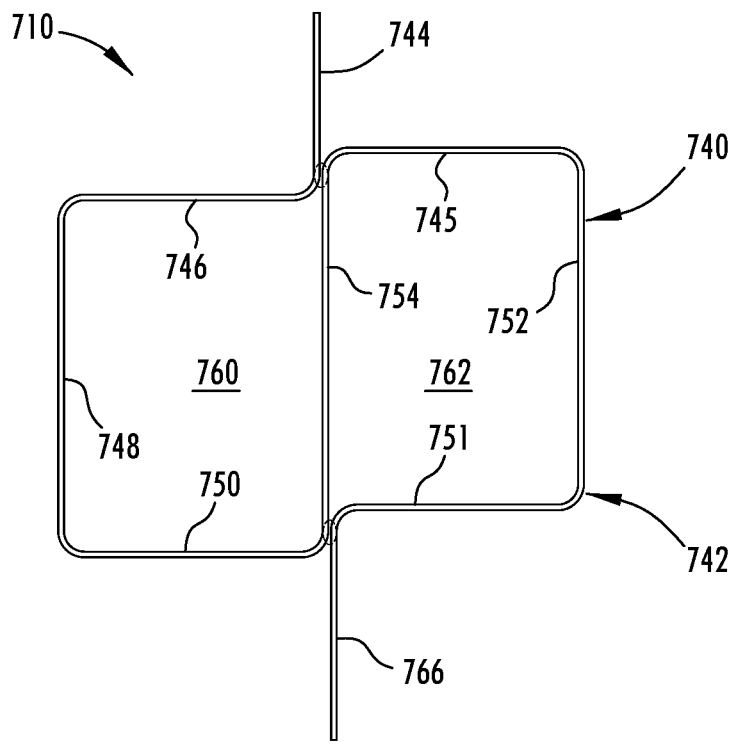
Figure 11A:
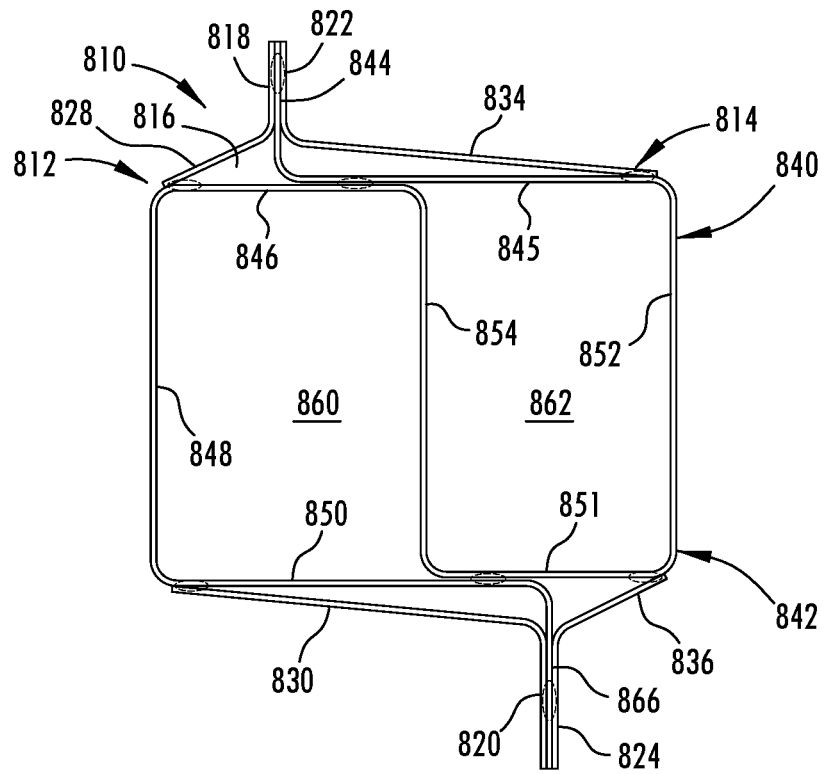
FIGS. 11A-11D are cross-sectional views of rocker components having another example of a reinforcement beam.
Figure 11B:
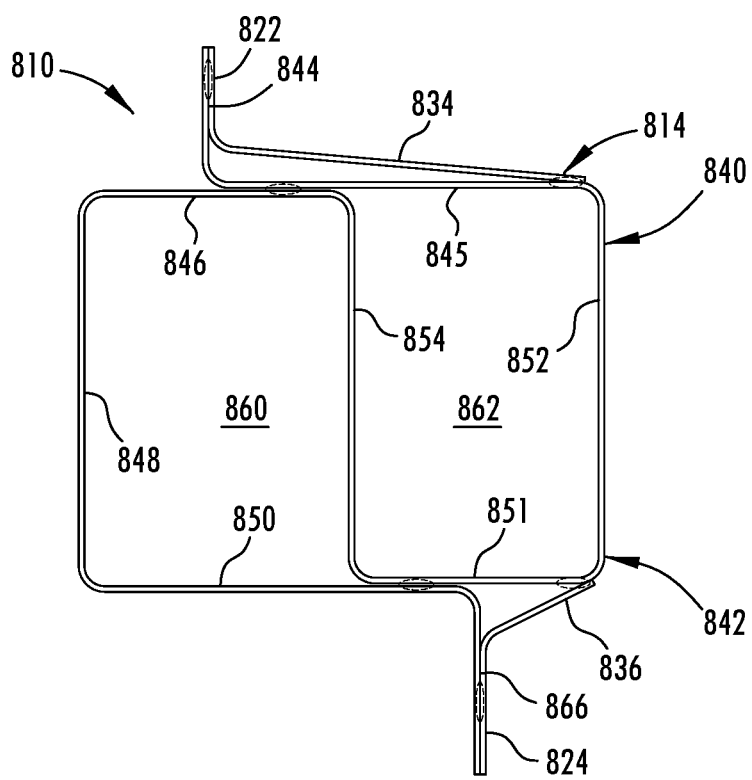
Figure 11C:
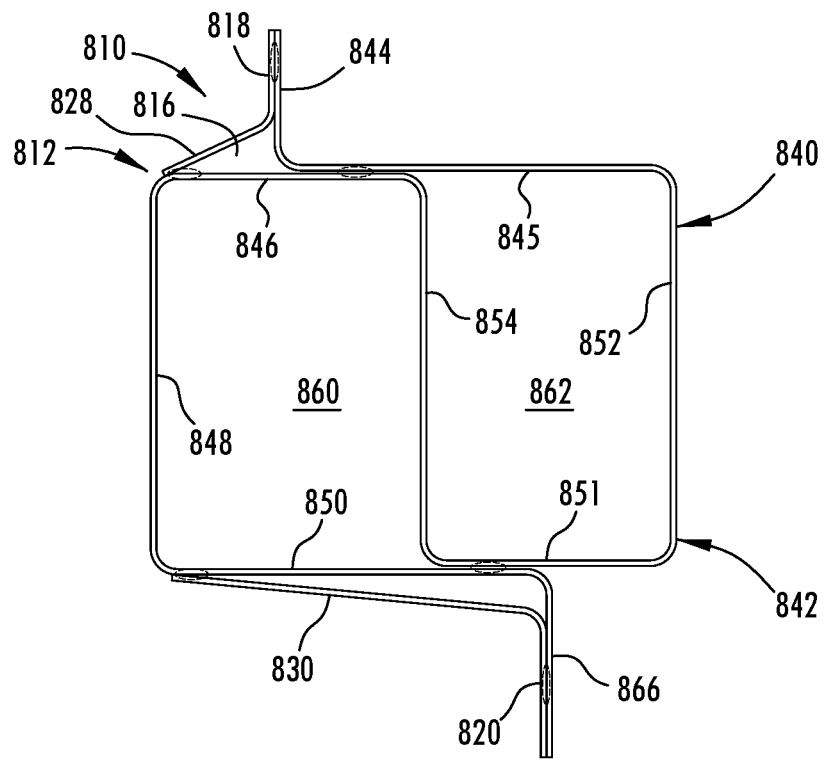
Figure 11D:
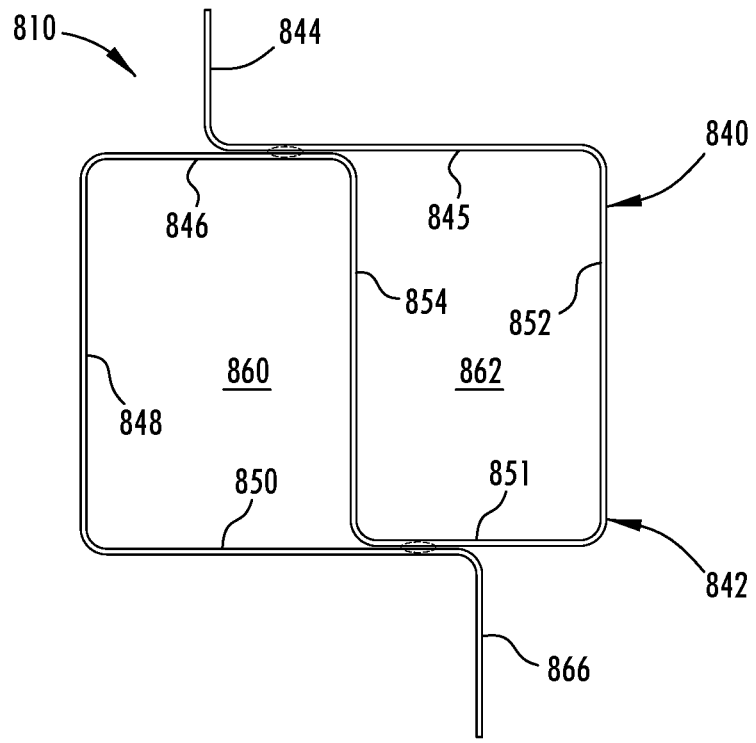
Figure 12A:
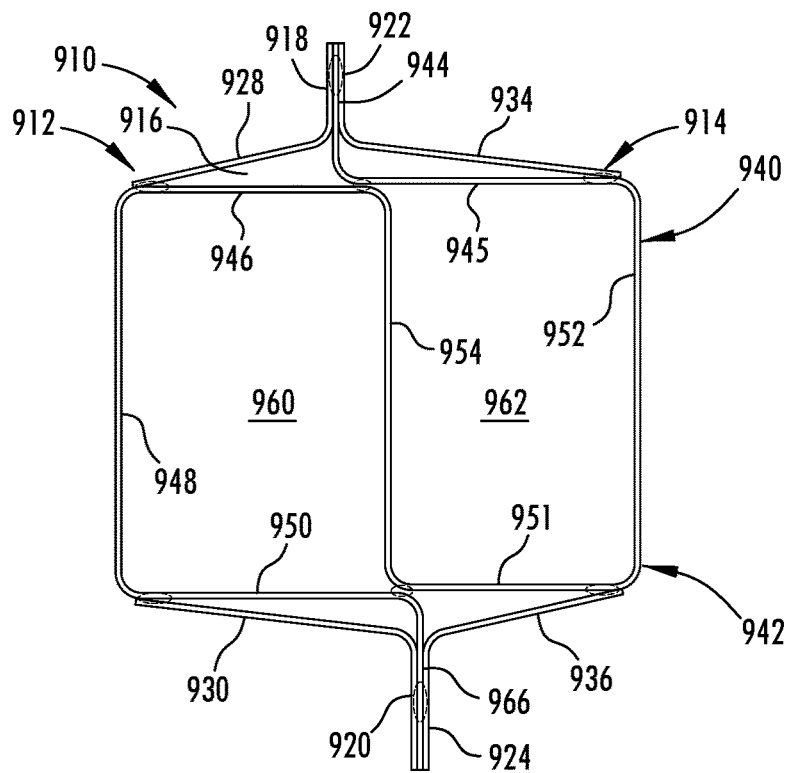
FIGS. 12A-12D are cross-sectional views of rocker components having a further example of a reinforcement beam.
Figure 12B:
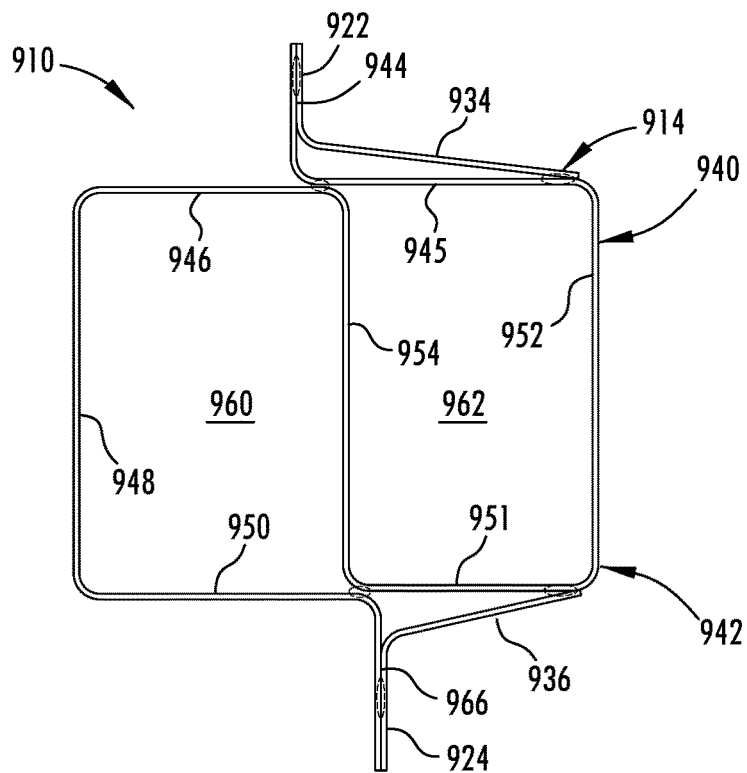
Figure 12C:
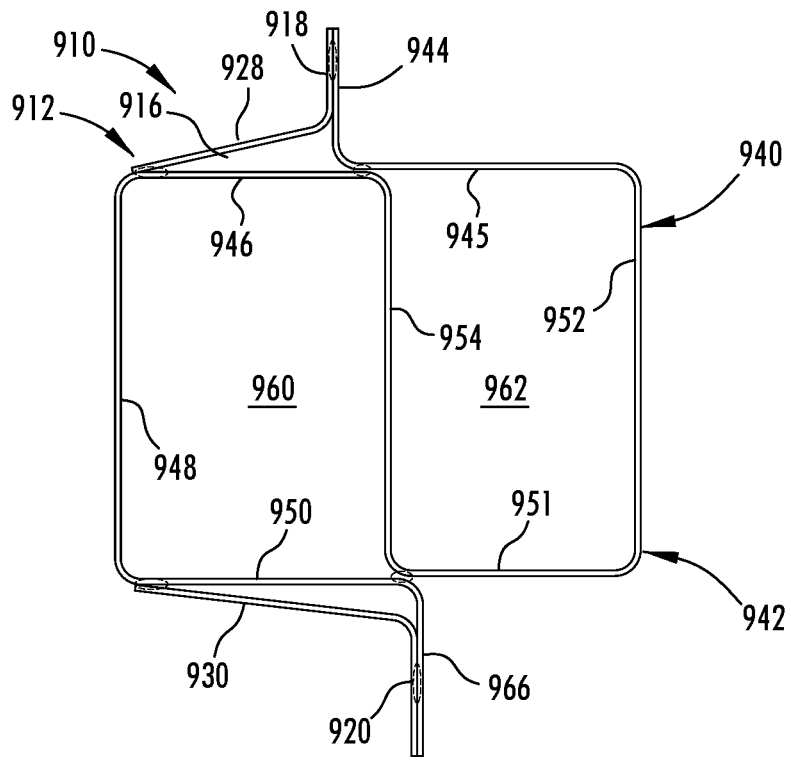
Figure 12D:
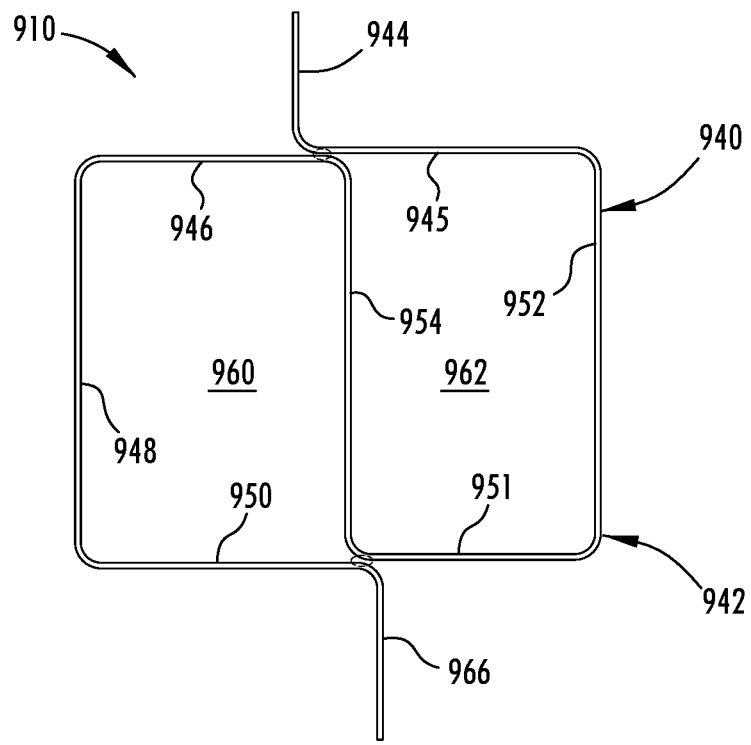
Figure 13A:
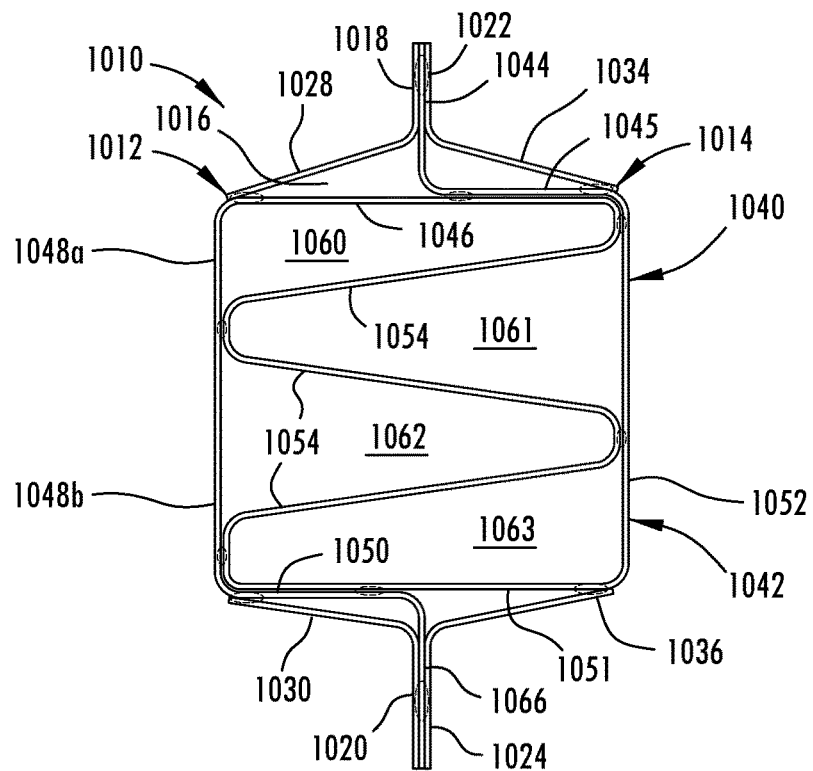
FIGS. 13A-13D are cross-sectional views of rocker components having a different example of a reinforcement beam.
Figure 13B:
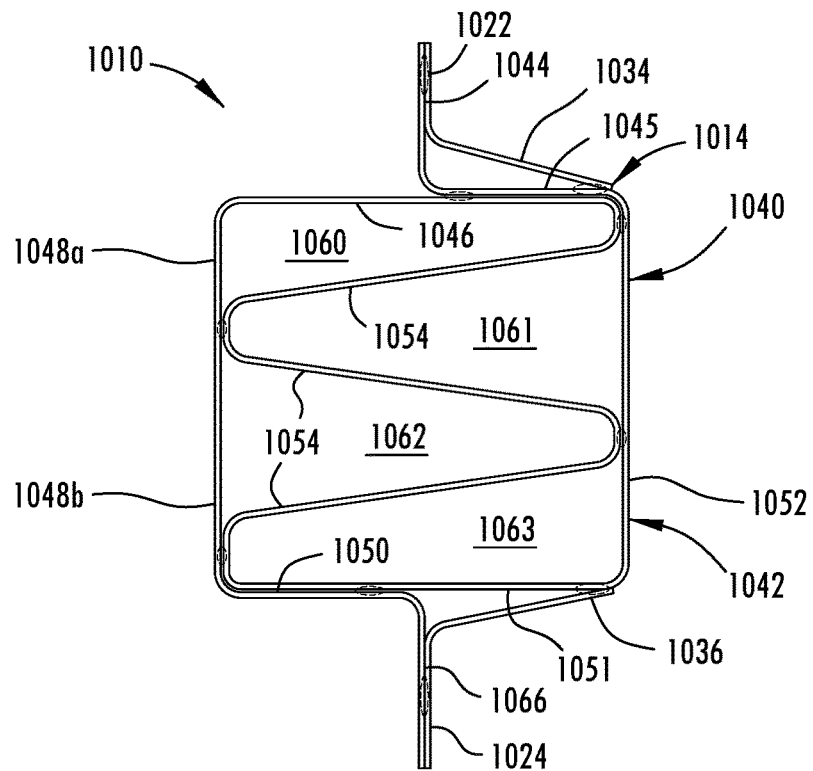
Figure 13C:
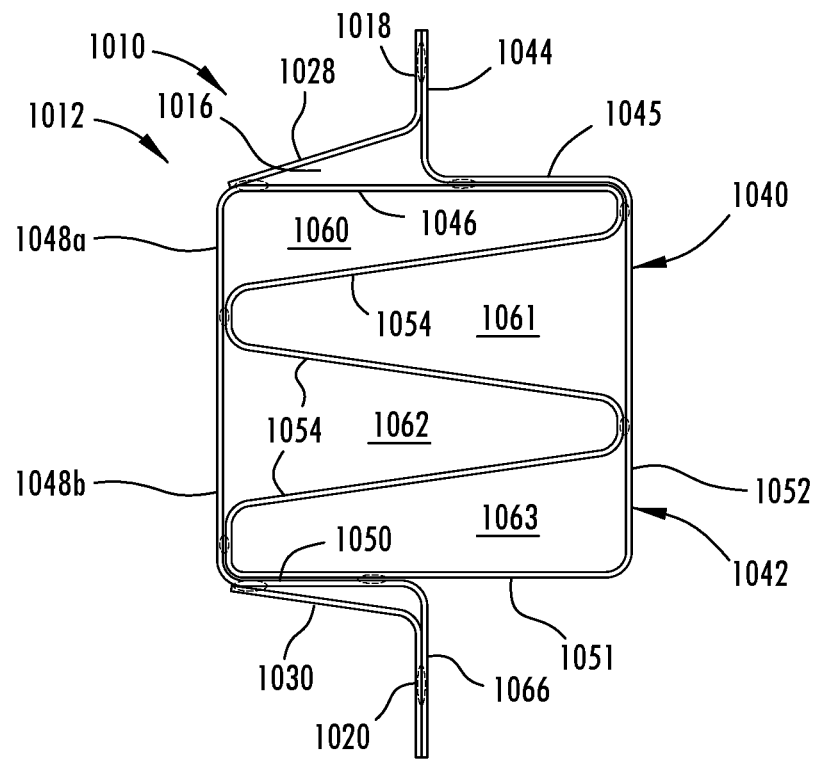
Figure 13D:
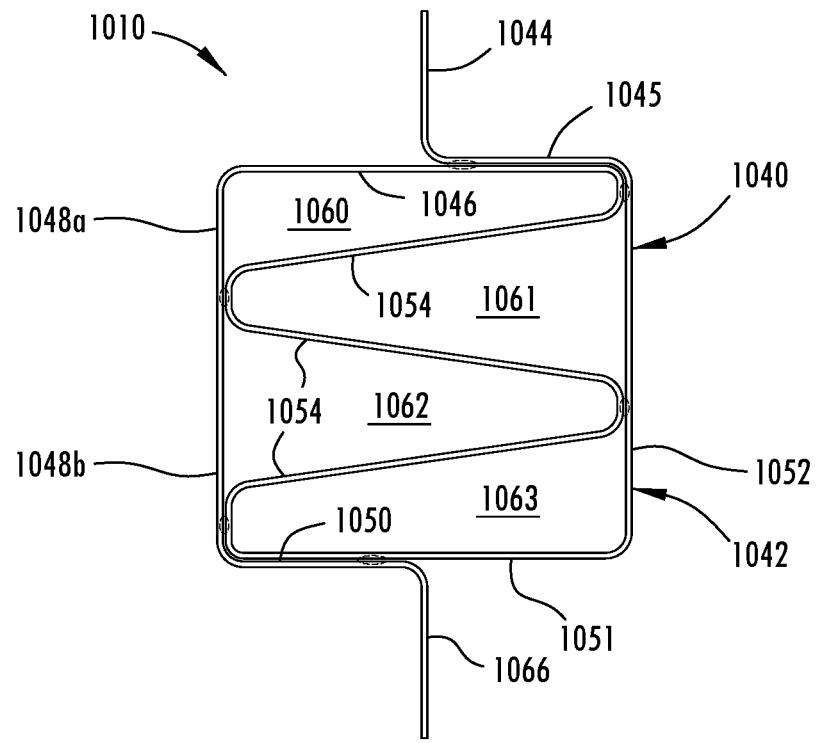
Figure 14A:
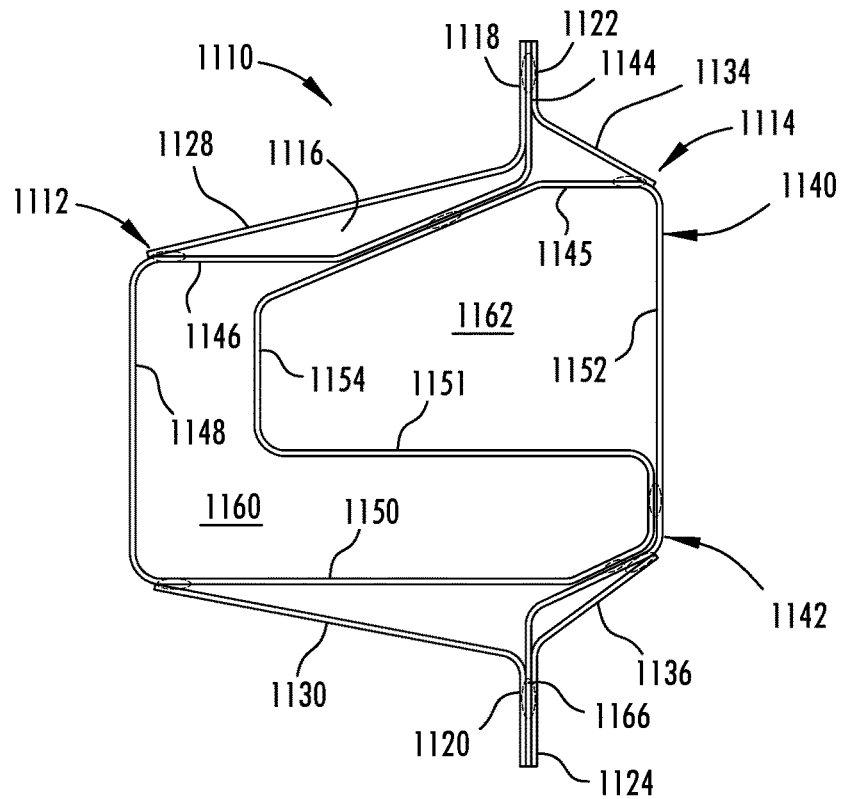
FIGS. 14A-14D are cross-sectional views of rocker components having another example of a reinforcement beam.
Figure 14B:
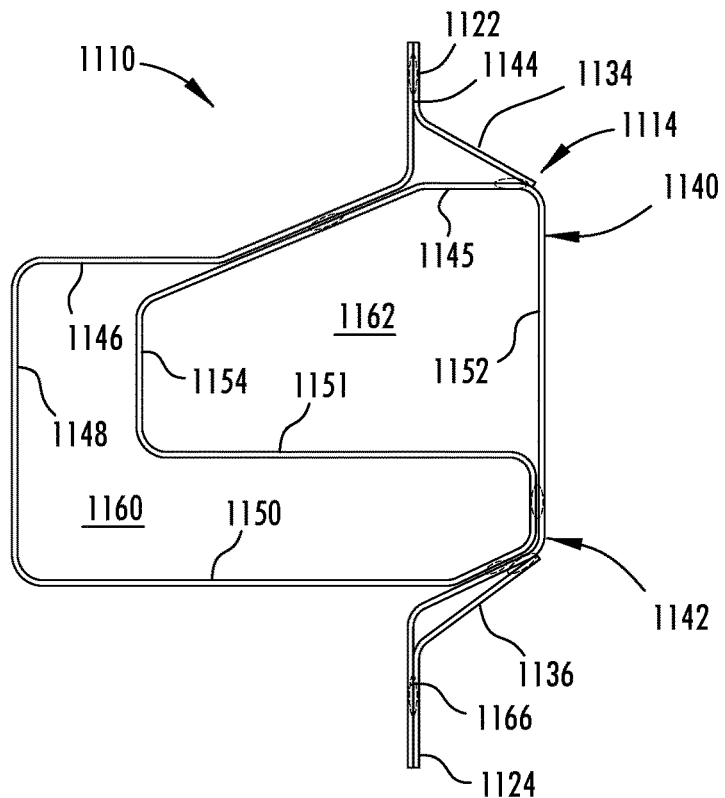
Figure 14C:
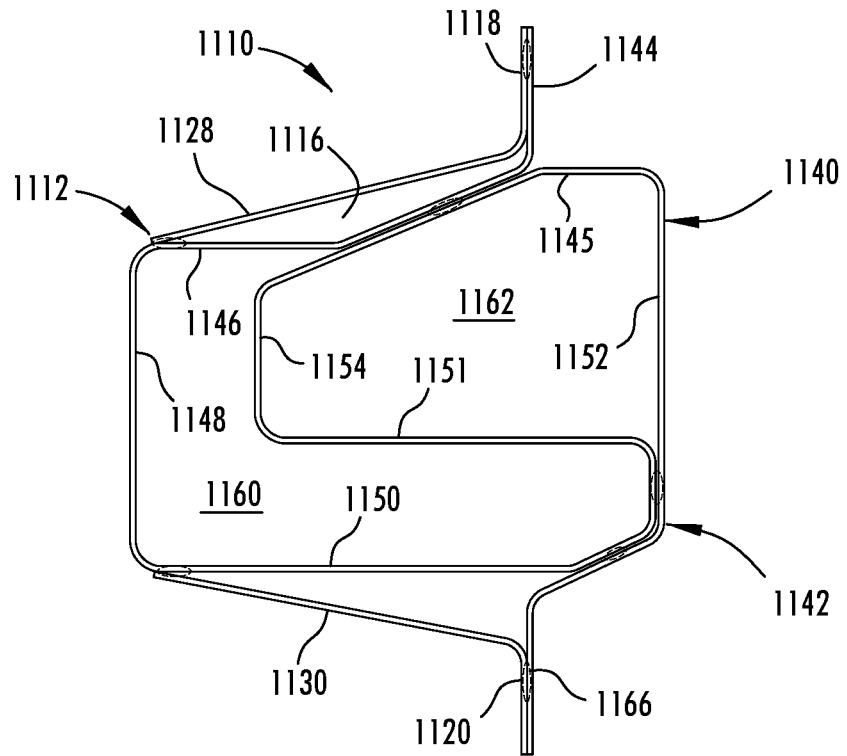
Figure 14D:
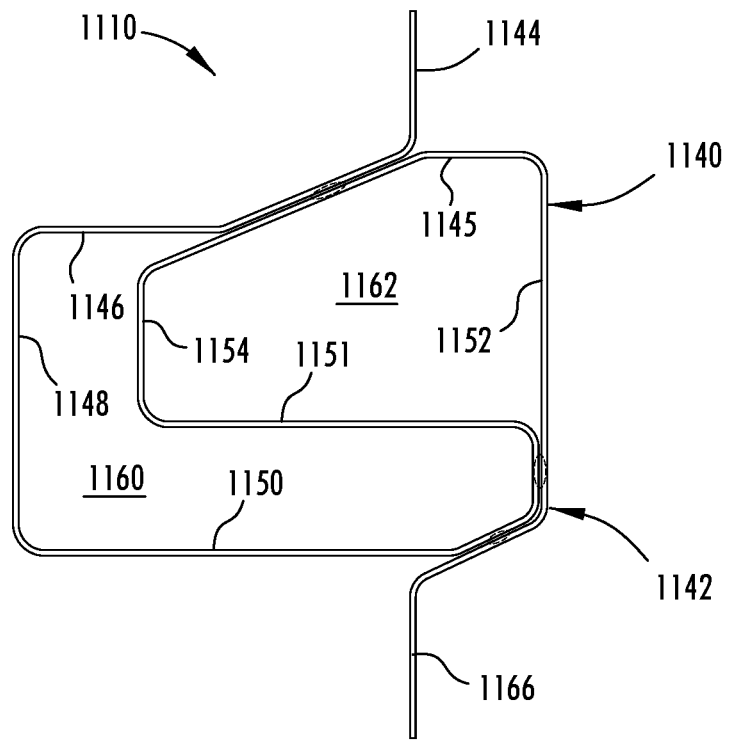
Figure 15A:
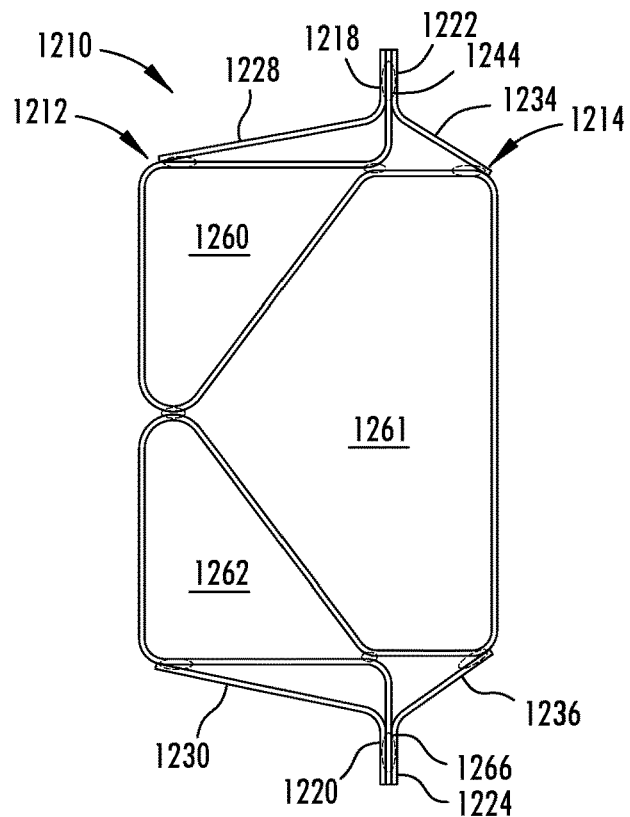
FIGS. 15A-15D are cross-sectional views of rocker components having a further example of a reinforcement beam.
Figure 15B:
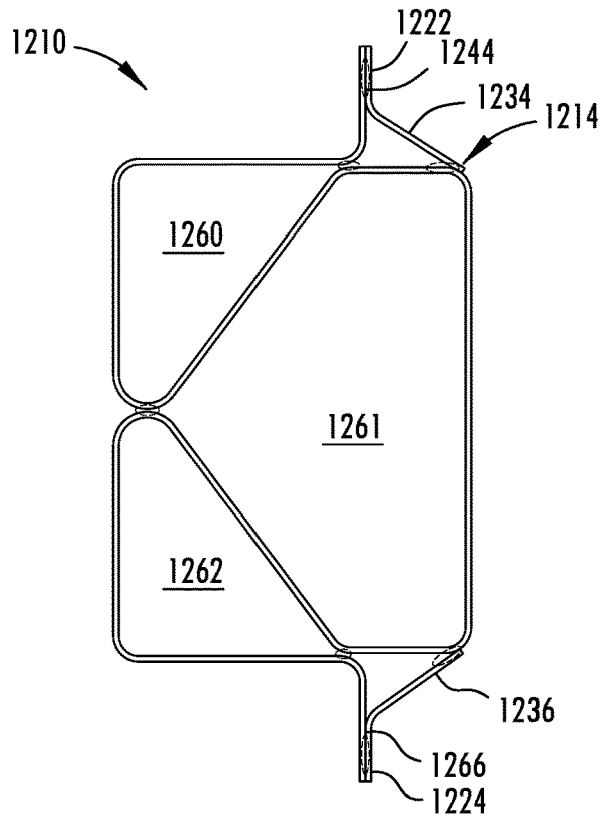
Figure 15C:
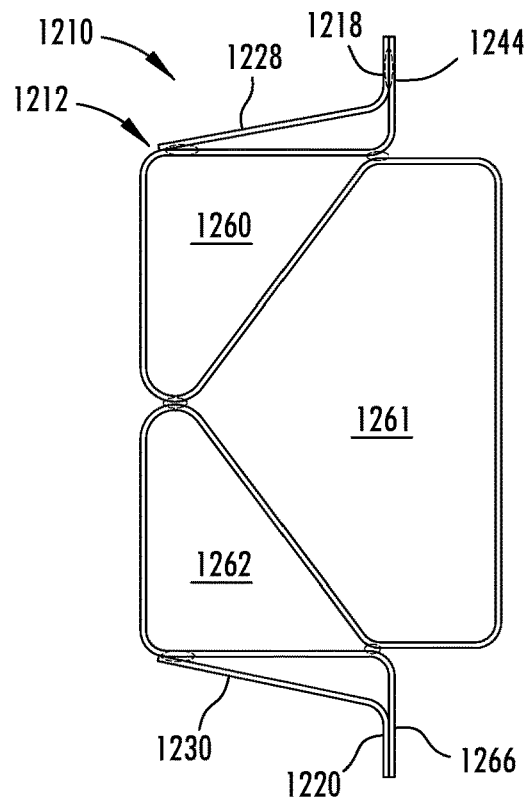
Figure 15D:
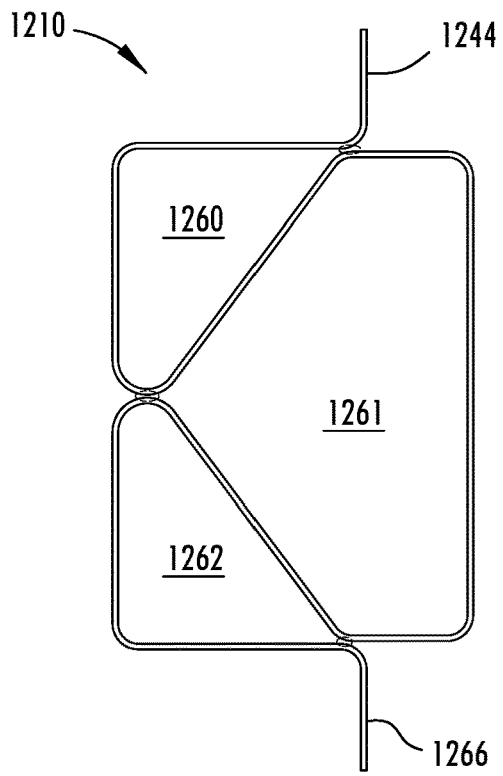

As shown in FIG. 10A, a reinforcement beam 740 is provided with a similar configuration to the reinforcement beam 640 shown in FIG. 9A with a beam portion 742 that has two hollow interior areas 760, 762 that are divided by a central wall section 754. Different from the reinforcement beam 640, the outer lower wall section 751 is disposed above and does not overlap a portion of the inner lower wall section 750. Accordingly, the center wall section 754 extends downward beyond the outer lower wall section 751 to partially overlap an upper end of the second flange portion 766, such that the inner lower wall section 750 that integrally extends from the lower end of the center wall section 754 is disposed vertically below the outer lower wall section 751.

As shown in FIGS. 10A, 10B, 10C, and 10D, some implementations of the rocker component 710 have both the inner sill panel omitted and the outer sill panel omitted. In these examples, the wall section of the reinforcement beam adjacent to the omitted sill panel defines the corresponding innermost or outermost wall of the rocker component 710. Thus, the reinforcement beam 740 may integrate one or two sill panels with a reinforcement structure by utilizing a single metal sheet. Additionally, in the example shown in FIG. 10A, the rocker component includes brackets 728, 730, 734, and 736 to help support the reinforcement beam 740. The brackets 728, 730, 734, and 736 are generally L-shaped brackets which have a generally vertically extending portion similar to the flange portion of a sill inner and a laterally extending portion which extends to the corresponding shear wall of the reinforcement beam 745, 746, 750, 751. More specifically, FIG. 10A includes four brackets 728, 730, 734, 736, two upper and two lower which are configured to sandwich both upper and lower flange portions 744, 766 of the reinforcement beam. In the example shown in FIG. 10B, the brackets 728, 730 disposed adjacent to the inner portion of the reinforcement beam 740 are omitted while the brackets 734, 736 disposed adjacent to the outer portion of the reinforcement beam 740 are present. In the example shown in FIG. 10C, the brackets 734, 736 disposed adjacent to the outer portion of the reinforcement beam 740 are omitted while the brackets 728, 730 disposed adjacent the inner portion of the reinforcement beam 740 are present. In the example shown in FIG. 10D, all of the brackets 728, 730, 734, 736 are omitted. For sake of avoiding repetition, other features of the rocker component 710 shown in FIGS. 10A-10D that are the same or similar to the rocker component 710 of FIG. 10A, including those with like reference numbers, are not described again in detail.

As shown in FIGS. 11A-11D and 12A-12D, reinforcement beams 840, 940 are also provided with a similar configuration to the reinforcement beam 640 shown in FIGS. 9A-9D with beam portions 842, 942 that each have two hollow interior areas 860, 862, 960, 962 that are respectively divided by a central wall section 854, 954. Different from the reinforcement beam 640, the outer upper wall section 845, 945 is disposed above and overlaps a portion of the inner upper wall section 846, 946. Accordingly, the center wall section 854, 954 does not overlap either flange portion 844, 866, 944, 966, such that the center wall section 854, 954 terminates at the intermediate extent of the outer upper wall section 845, 945 at the upper end and at the intermediate extent of the inner lower wall section 850, 950. The center wall section 854, 954 may then be generally centered between the laterally offset flanges, such as when laterally offset at a larger distance as shown in FIGS. 11A-11D when compared to the relatively shorter lateral offset shown in 12A-12D.

As shown in FIGS. 11A, 11B, 11C, and 11D, some implementations of the rocker component 810 have both the inner sill panel omitted and the outer sill panel omitted. In these examples, the wall section of the reinforcement beam adjacent to the omitted sill panel defines the corresponding innermost or outermost wall of the rocker component 810. Thus, the reinforcement beam 840 may integrate one or two sill panels with a reinforcement structure by utilizing a single metal sheet. Additionally, in the example shown in FIG. 11A, the rocker component includes brackets 828, 830, 834, and 836 to help support the reinforcement beam 840. The brackets 828, 830, 834, and 836 are generally L-shaped brackets which have a generally vertically extending portion similar to the flange portion of a sill inner and a laterally extending portion which extends to the corresponding shear wall of the reinforcement beam 845, 846, 850, 851. More specifically, FIG. 11A includes four brackets 828, 830, 834, 836, two upper and two lower which are configured to sandwich both upper and lower flange portions 844, 866 of the reinforcement beam. In the example shown in FIG. 11B, the brackets 828, 830 disposed adjacent to the inner portion of the reinforcement beam 840 are omitted while the brackets 834, 836 disposed adjacent to the outer portion of the reinforcement beam 840 are present. In the example shown in FIG. 11C, the brackets 834, 836 disposed adjacent to the outer portion of the reinforcement beam 840 are omitted while the brackets 828, 830 disposed adjacent the inner portion of the reinforcement beam 840 are present. In the example shown in FIG. 11D, all of the brackets 828, 830, 834, 836 are omitted. For sake of avoiding repetition, features of the rocker component 910 shown in FIGS. 12A-12D that are the same or similar to the rocker component 810 of FIGS. 11A-11D, including those with like reference numbers, are not described again in detail and are illustrated in the drawings with similar reference numbers, incremented by 900.

As shown in FIGS. 13A-13D, the upper and lower flanges 1018, 1020, 1022, 1024 may be vertically aligned. The reinforcement beam 1040 shown in FIGS. 13A-13D is a similar configuration to the reinforcement beam 840 shown in FIGS. 11A-11D with portions of the upper wall sections 1045, 1046 overlapping and with portions of the lower wall sections 1050, 1051 overlapping. The central wall sections 1054, however, are provided similar to the reinforcement beam 340 shown in FIG. 6 with the metal sheet transitioning upward in an alternating diagonal formation to provide three intermediate shear wall sections 1054 before transitioning inward at the upper wall section 1046 and then transitioning linearly downward along an inner side of the beam portion 1042 to defines upper and lower inner wall sections 1048*a*, 1048*b*.

As shown in FIGS. 13A, 13B, 13C, and 13D, some implementations of the rocker component 1010 have both the inner sill panel omitted and the outer sill panel omitted. In these examples, the wall section of the reinforcement beam adjacent to the omitted sill panel defines the corresponding innermost or outermost wall of the rocker component 1010. Thus, the reinforcement beam 1040 may integrate one or two sill panels with a reinforcement structure by utilizing a single metal sheet. Additionally, in the example shown in FIG. 13A, the rocker component includes brackets 1028, 1030, 1034, and 1036 to help support the reinforcement beam 1040. The brackets 1028, 1030, 1034, and 1036 are generally L-shaped brackets which have a generally vertically extending portion similar to the flange portion of a sill inner and a laterally extending portion which extends to the corresponding shear wall of the reinforcement beam 1045, 1046, 1050, 1051. More specifically, FIG. 13A includes four brackets 1028, 1030, 1034, 1036, two upper and two lower which are configured to sandwich both upper and lower flange portions 1044, 1066 of the reinforcement beam. In the example shown in FIG. 13B, the brackets 1028, 1030 disposed adjacent to the inner portion of the reinforcement beam 1040 are omitted while the brackets 1034, 1036 disposed adjacent to the outer portion of the reinforcement beam 1040 are present. In the example shown in FIG. 13C, the brackets 1034, 1036 disposed adjacent to the outer portion of the reinforcement beam 1040 are omitted while the brackets 1028, 1030 disposed adjacent the inner portion of the reinforcement beam 1040 are present. In the example shown in FIG. 13D, all of the brackets 1028, 1030, 1034, 1036 are omitted. For sake of avoiding repetition, other features of the rocker component 1010 shown in FIGS. 13B-D that are the same or similar to the rocker component 1010 of FIG. 13A, including those with like reference numbers, are not described again in detail. In additional implementations, the angular orientation of the central wall section is arranged to generally extend between offset flanges, such to angle from the upper flanges toward lower flanges that are offset inward from the upper flanges.

Referring to FIGS. 14A-14D, additional examples of a rocker component 1110 is shown having a similar configuration to the examples shown in FIGS. 9A-9D with the cross-sectional shape of the reinforcement beam 1140 altered primarily at the degree of angle transitions between wall sections of the beam portion 1142 and between the beam portion 1142 and the flange portions 1144, 1166. For example, the beam portion 1142 of the reinforcement beam 1140 includes a substantially horizontal wall section 1153 along a portion of the central wall section 1154 to provide a shear wall section in addition to the upper and lower shear wall sections 1145, 1146, 1150.

As shown in FIGS. 14A, 14B, 14C, and 14D, some implementations of the rocker component 1110 have both the inner sill panel omitted and the outer sill panel omitted. In these examples, the wall section of the reinforcement beam adjacent to the omitted sill panel defines the corresponding innermost or outermost wall of the rocker component 1110. Thus, the reinforcement beam 1140 may integrate one or two sill panels with a reinforcement structure by utilizing a single metal sheet. Additionally, in the example shown in FIG. 14A, the rocker component includes brackets 1128, 1130, 1134, and 1136 to help support the reinforcement beam 1140. The brackets 1128, 1130, 1134, and 1136 are generally L-shaped brackets which have a generally vertically extending portion similar to the flange portion of a sill inner and a laterally extending portion which extends to the corresponding shear wall of the reinforcement beam 1145, 1146, 1150, 1151. More specifically, FIG. 14A includes four brackets 1128, 1130, 1134, 1136, two upper and two lower which are configured to sandwich both upper and lower flange portions 1144, 1166 of the reinforcement beam. In the example shown in FIG. 14B, the brackets 1128, 1130 disposed adjacent to the inner portion of the reinforcement beam 1140 are omitted while the brackets 1134, 1136 disposed adjacent to the outer portion of the reinforcement beam 1140 are present. In the example shown in FIG. 14C, the brackets 1134, 1136 disposed adjacent to the outer portion of the reinforcement beam 1140 are omitted while the brackets 1128, 1130 disposed adjacent the inner portion of the reinforcement beam 1140 are present. In the example shown in FIG. 14D, all of the brackets 1128, 1130, 1134, 1136 are omitted. For sake of avoiding repetition, other features of the rocker component 1110 shown in FIGS. 14B-9D that are the same or similar to the rocker component 1110 of FIG. 14A, including those with like reference numbers, are not described again in detail.

Further examples of a rocker component 1210 are shown in FIGS. 15A-15D, having a similar configuration to the examples shown in FIGS. 7A-7D with the cross-sectional shape of the reinforcement beam 1240 altered in the roll form bending configuration or flower pattern of the metal sheet that forms the reinforcement beam 1240. Specifically, the reinforcement beam 1240 forms an upper tubular portion surrounding an upper hollow area 1260 and a lower tubular portion surrounding a lower hollow area 1262, with the sheet connecting the upper and lower tubular portions along an outer wall section 1232 of the reinforcement beam 1240 to enclose a third hollow area 1261.

As shown in FIGS. 15A, 15B, 15C, and 15D, some implementations of the rocker component 1210 have both the inner sill panel omitted and the outer sill panel omitted. In these examples, the wall section of the reinforcement beam adjacent to the omitted sill panel defines the corresponding innermost or outermost wall of the rocker component 1210. Thus, the reinforcement beam 1240 may integrate one or two sill panels with a reinforcement structure by utilizing a single metal sheet. Additionally, in the example shown in FIG. 15A, the rocker component includes brackets 1228, 1230, 1234, and 1236 to help support the reinforcement beam 1240. The brackets 1228, 1230, 1234, and 1236 are generally L-shaped brackets which have a generally vertically extending portion similar to the flange portion of a sill inner and a laterally extending portion which extends to the corresponding shear wall of the reinforcement beam 1245, 1246, 1250, 1251. More specifically, FIG. 15A includes four brackets 1228, 1230, 1234, 1236, two upper and two lower which are configured to sandwich both upper and lower flange portions 1244, 1266 of the reinforcement beam. In the example shown in FIG. 15B, the brackets 1228, 1230 disposed adjacent to the inner portion of the reinforcement beam 1240 are omitted while the brackets 1234, 1236 disposed adjacent to the outer portion of the reinforcement beam 1240 are present. In the example shown in FIG. 15C, the brackets 1234, 1236 disposed adjacent to the outer portion of the reinforcement beam 1240 are omitted while the brackets 1228, 1230 disposed adjacent the inner portion of the reinforcement beam 1240 are present. In the example shown in FIG. 15D, all of the brackets 1228, 1230, 1234, 1236 are omitted. For sake of avoiding repetition, other features of the rocker component 1210 shown in FIGS. 15A-15D that are the same or similar to the rocker component 1210 of FIG. 15A, including those with like reference numbers, are not described again in detail.

Figure 16:
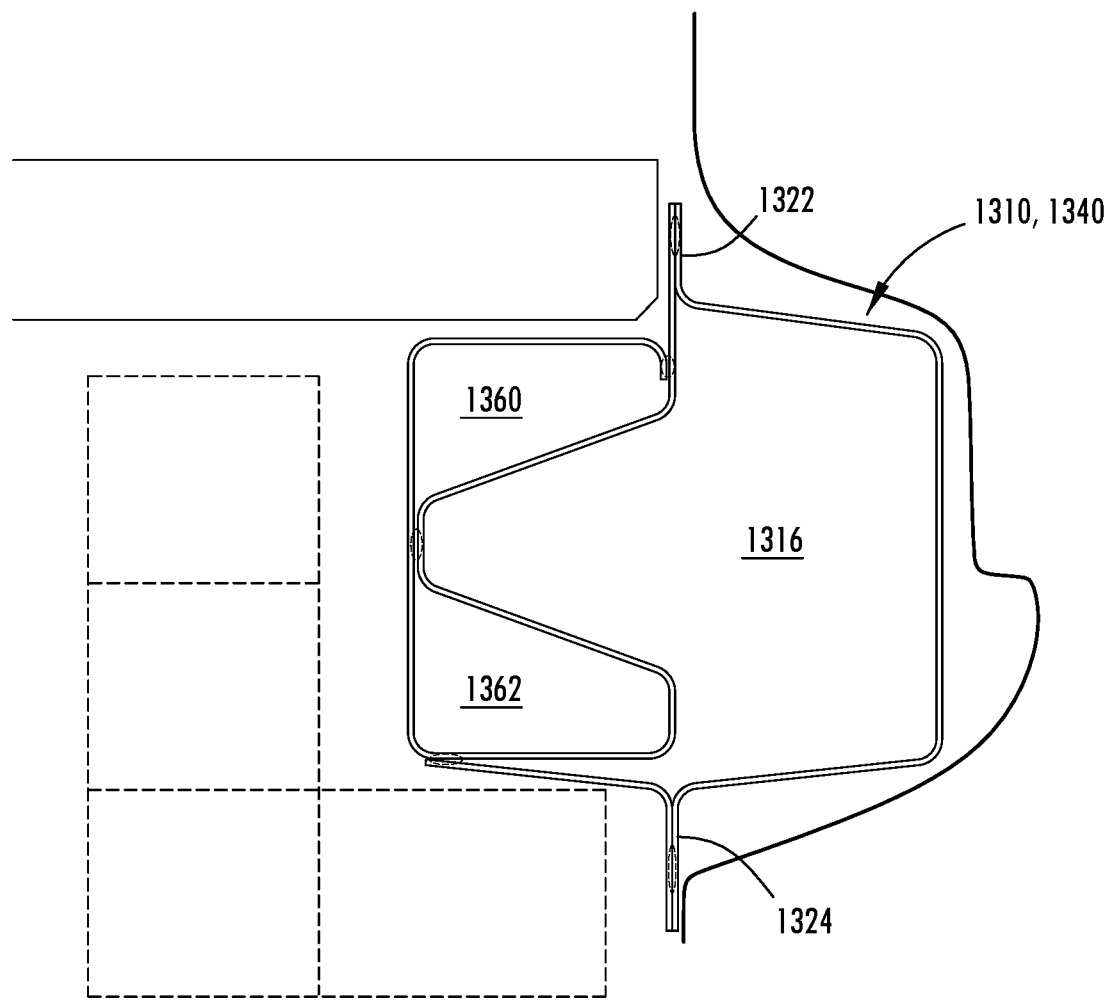
FIG. 16 is a cross-sectional view a of rocker component having a yet another example of a reinforcement beam.

Similar to the reinforcement beam 1240 and rocker component of FIG. 15A-D, another example of a rocker component 1310 is shown in FIG. 16 with like reference numbers incremented by 100 from that shown in FIGS. 15A-15D. As shown in FIG. 16 (as also shown in FIG. 1A), the rocker component 1310 is situated outboard to a battery tray and inboard to a body side panel. Also, a floor cross-member is shown spanning above the battery tray and interconnecting with the inner portion of the rocker component 1310, above the upper hollow area 160 and inboard the upper flange 1344. Additional connection configurations are also contemplated for other examples, such as the example shown in FIG. 1B.

Although the reinforcement beam may have a structure at the beam portion that provides sufficient stiffness and strength, it is contemplated that the vehicle component may include one or more bulkhead members that are disposed generally orthogonally relative to the longitudinal extent of the rocker component. For example, when the outer rocker panel is desired to be further stiffened, such as for protecting battery modules disposed in a tray between rocker assemblies, a series of bulkhead members may be disposed at spaced intervals along the hollow interior between an outer wall section of the reinforcement beam and an outer panel of a rocker component. The bulkhead members may connect to the outer panel and/or reinforcement beam with a mechanical fastener, welding, adhesive, or any combination thereof. Moreover, it is contemplated that the inner and outer panels may include wall stiffeners that may be attached at select locations of the inner and outer panels. For example, the wall stiffeners may be attached at and reinforce the rounded corners of the metal sheets that form the inner and outer panels. It is contemplated that additional or alternative attachment locations may be used in other examples.

It is also contemplated that the internal reinforcements of the disclosed vehicle component may be incorporated in other types of structural beams, such as in frames and structures of automotive and marine vehicles, buildings, storage tanks, furniture, and the like. With respect to vehicle applications, the vehicle component disclosed herein may be incorporated with various applications of different structural components. The vehicle component may be designed to support and sustain different loading conditions, such as for supporting certain horizontal spans or axial loading conditions. Also, the vehicle component may be designed to undergo various impact forces, such as for the illustrated rocker assemblies, pillar structures, and the like. The cross-sectional geometry, material type selections, and material thickness within the cross-sectional profile of the vehicle component may be configured for such a particular use and the desired loading and performance characteristics, such as the weight, load capacity the beam, force deflection performance, and impact performance of the vehicle component.

For purposes of this disclosure, the articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional implementations that also incorporate the recited features. Furthermore, the terms "first," "second," and the like, as used herein do not denote any order, quantity, or importance, but rather are used to denote element from another.

Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. For example, the terms "approximately," "about," and "substantially" may refer to an amount that is within less than 5% of, within less than 1% of, within less than 0.1% of, and within less than 0.01% of a stated amount.

Further, it should be understood that any directions or reference frames in the preceding description are merely relative directions or movements. For example, the terms "upper," "lower," "right," "left," "rear," "front," "vertical," "horizontal," "inboard," "outboard" and derivatives thereof shall relate to the orientation shown in FIG. 1. However, it is to be understood that various alternative orientations may be provided, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A rocker component for a vehicle, the rocker component comprising:
a reinforcement beam having a metal sheet that is formed with a cross-sectional shape extending continuously along a length of the reinforcement beam, wherein the reinforcement beam comprises a beam portion and a flange portion integrally extending from the beam portion, wherein the flange portion integrally extends from the beam portion and comprises an edge of the metal sheet, wherein the metal sheet comprises a multi-hollow substantially triangular shape that encloses a plurality of closed section hollow cavities that extend longitudinally between openings at opposing ends of the reinforcement beam, and wherein the multi-hollow shape is defined by at least one of an outer wall section, a first oblique shear wall section, and a second oblique shear wall section;
a bracket having a first section joined to the beam portion of the reinforcement beam and a second section integrally extending from the first section away from the beam portion; and
a sill panel having upper and lower flanges extending longitudinally along upper and lower edges of the sill panel relative to the vehicle, wherein the flange portion of the reinforcement beam is joined to one of the upper and lower flanges of the sill panel, and wherein the second section of the bracket is joined to the other one of the upper and lower flanges to secure the reinforcement beam to the sill panel in replacement of a separate second sill panel.

2. The rocker component of claim 1, wherein the sill panel is a sill inner panel relative to the vehicle and the bracket and the reinforcement beam define an outer panel relative to the vehicle.

3. The rocker component of claim 1, wherein the sill panel is a sill outer panel relative to the vehicle and the bracket and the reinforcement beam define an inner panel relative to the vehicle.

4. The rocker component of claim 1, wherein the lower flange portion of the reinforcement beam is joined to the lower flange of the sill panel and the upper flange portion of the reinforcement beam is joined to the upper flange of the sill panel.

5. The rocker component of claim 1, wherein the second section of the bracket is joined to one of the upper flange portion or the lower flange portion of the reinforcement beam.

6. The rocker component of claim 1, wherein the bracket extends continuously along the length of the reinforcement beam.

7. The rocker component of claim 6, wherein the bracket and the reinforcement beam together enclose a hollow interior space between the sill panel and the bracket and the reinforcement beam.

8. The rocker component of claim 1, wherein the flange portion of the reinforcement beam integrally extends downward from the beam portion relative to the vehicle.

9. The rocker component of claim 1, wherein the flange portion of the reinforcement beam extends continuously along the length of the reinforcement beam.

10. The rocker component of claim 1, wherein the metal sheet of the reinforcement beam comprises a plurality of elongated bends extending in parallel along a length of the reinforcement beam to form the cross-sectional shape, and wherein at least one of the plurality of elongated bends is welded along a portion of the metal sheet to enclose at least one of the plurality of elongated hollow cavities.

11. The rocker component of claim 1, wherein the metal sheet of the reinforcement beam comprises a plurality of elongated bends extending in parallel along a length of the reinforcement beam to form the cross-sectional shape, wherein the beam portion of the reinforcement beam comprises wall sections including the first oblique shear wall section and the second obliquie shear wall section, and wherein the wall sections are disposed between the elongated bends, the wall sections angled relative to each other to surround each of the plurality of hollow cavities that extends longitudinally along the reinforcement beam and together form the multi-hollow shape.

12. The rocker component of claim 11, wherein the wall sections of the beam portion comprise a shear wall section that is substantially perpendicular to a planar extension of the flange portion.

13. The rocker component of claim 11, wherein the first oblique shear wall section and the second oblique shear wall section are angled approximately 30 to 60 degrees relative to a planar extension of the flange portion.

14. A rocker component for a vehicle, the rocker component comprising:
a reinforcement beam having a metal sheet that is shaped with a plurality of elongated bends extending in parallel along a length of the reinforcement beam that together form a cross-sectional shape extending continuously along the length of the reinforcement beam, the cross-sectional shape including a first shear wall and a second shear wall that join at an outer wall;
wherein the cross-sectional shape of the reinforcement beam comprises a beam portion and a flange portion integrally extending from the beam portion;
wherein the flange portion integrally extends from the beam portion and extends continuously along the length of the reinforcement beam;
wherein the metal sheet comprises a closed cross-sectional shape that encloses at least one substantially triangular hollow cavity that extends longitudinally between openings at opposing ends of the reinforcement beam, the at least one hollow cavity being formed at least by one of the first shear wall and the second shear wall; and
a sill panel having flanges extending longitudinally along upper and lower edges of the sill panel relative to the vehicle, the flange portion of the reinforcement beam joined to one of the flanges of the sill panel to secure the reinforcement beam to the sill panel.

15. The rocker component of claim 14, further comprising:
a bracket having a first section joined to the beam portion of the reinforcement beam and a second section integrally extending from the first section away from the beam portion, wherein the second section of the bracket is joined to the flange portion of the reinforcement beam, and wherein the flange portion is joined with the lower flange of the sill panel.

16. The rocker component of claim 15, wherein the sill panel comprises an upper flange and a lower flange extending longitudinally along the respective upper and lower edges of the sill panel relative to the vehicle, wherein the flange portion of the reinforcement beam is joined to the upper flange of the sill panel, and wherein the second section of the bracket is joined to the flange portion.

17. The rocker component of claim 16, wherein the sill panel is a sill inner panel relative to the vehicle and the bracket and the reinforcement beam define an outer panel.

18. The rocker component of claim 16, wherein the bracket extends continuously along the length of the reinforcement beam, such that the bracket and the reinforcement beam together enclose a hollow interior space between the sill panel and the reinforcement beam.

19. The rocker component of claim 14, wherein the flange portion of the reinforcement beam comprises an edge of the metal sheet extending continuously along the flange portion.

20. The rocker component of claim 19, wherein the reinforcement beam comprises a second flange portion formed by an opposing edge of the metal sheet, wherein the flange portion extends upward from the beam portion relative to the vehicle and is joined to an upper flange of the sill panel, and wherein the second flange portion extends downward from the beam portion relative to the vehicle and is joined to a lower flange of the sill panel.

\* \* \* \* \*